United States Patent [19]

Loo et al.

[11] Patent Number: 5,119,290

[45] Date of Patent: Jun. 2, 1992

[54] ALIAS ADDRESS SUPPORT

[75] Inventors: William V. Loo, Palo Alto; John Watkins, Sunnyvale; Joseph Moran, Santa Clara; William Shannon, Los Altos; Ray Cheng, Cupertino, all of Calif.

[73] Assignee: Sun Microsystems, Inc., Mountain View, Calif.

[21] Appl. No.: 554,186

[22] Filed: Jul. 16, 1990

Related U.S. Application Data

[63] Continuation of Ser. No. 104,635, Oct. 2, 1987, abandoned.

[51] Int. Cl.⁵ .............................................. G06F 12/08
[52] U.S. Cl. .................................................. 395/400
[58] Field of Search ... 364/200 MS File, 900 MS File

[56] References Cited

U.S. PATENT DOCUMENTS

| 4,136,385 | 1/1979 | Gannon et al. | 364/200 |
|---|---|---|---|
| 4,141,067 | 2/1979 | McLagan | 364/200 |
| 4,161,024 | 7/1979 | Joyce et al. | 364/200 |
| 4,245,307 | 1/1981 | Kapeghian et al. | 364/200 |
| 4,264,953 | 4/1981 | Douglas et al. | 364/200 |
| 4,268,907 | 5/1981 | Porter et al. | 364/200 |
| 4,332,010 | 5/1982 | Messina et al. | 364/200 |
| 4,400,770 | 8/1983 | Chan et al. | 364/200 |
| 4,441,155 | 4/1984 | Fletcher et al. | 364/200 |
| 4,445,174 | 4/1984 | Fletcher | 364/200 |
| 4,473,878 | 9/1984 | Zolnowsky et al. | 364/200 |
| 4,481,573 | 11/1984 | Fukunaga et al. | 364/200 |
| 4,785,398 | 11/1988 | Joyce et al. | 364/200 |
| 4,825,412 | 4/1989 | Sager et al. | 364/200 |

Primary Examiner—Joseph A. Popek
Assistant Examiner—Rebecca L. Rudolph
Attorney, Agent, or Firm—Blakely Sokoloff Taylor & Zafman

[57] ABSTRACT

Improvements in workstations which utilizes virtual addressing in multi-user operating systems with write back caches, including operating systems which allow each user to have multiple active processes directed to the support of alias addresses, i.e., two or more virtual addresses which map to the same physical address in real memory. Specially, alias addresses are created so that their low order address bits are identical, modulo the size of the cache (as a minimum) for user programs which use alias addresses generated by the kernel, or wholely within the kernel. For alias addresses in the operating system, rather than user programs, which cannot be made to match in their low order address bits, their pages are assigned as "Don't Cache" pages in the memory management unit (MMU) employed by workstations which utilize virtual addressing.

9 Claims, 20 Drawing Sheets

VIRTUAL ADDRESS CACHE:
CACHE AND MMU PROTECTION VIOLATIONS

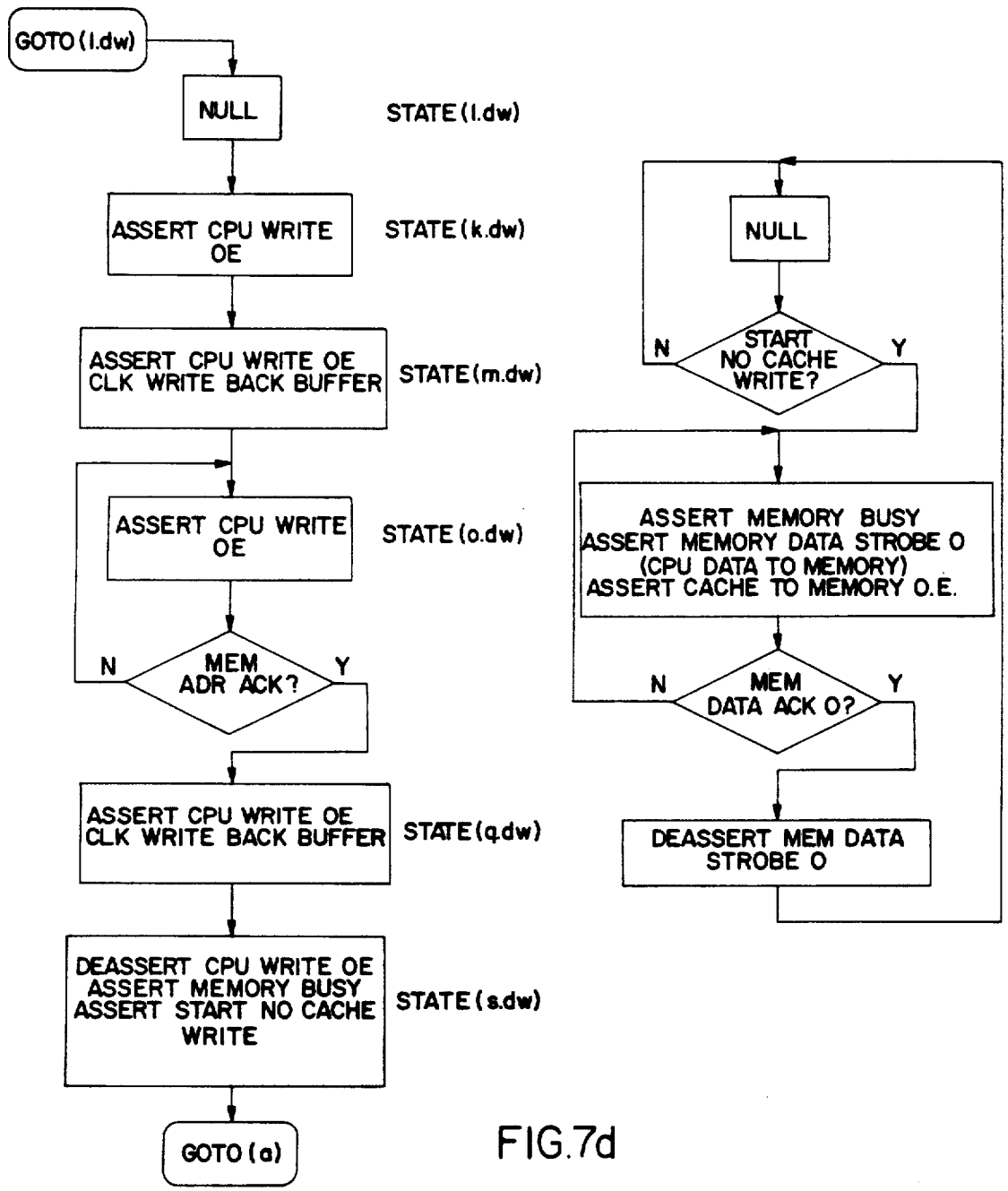

NOTE: ALL CONTROL SIGNALS ARE NEGATIVE ACTIVE SIGNALS

“ALIAS ADDRESS SUPPORT

This is a continuation of application Ser. No. 104,635 filed Oct. 2, 1987, now abandoned.

SUMMARY OF THE INVENTION

This invention is directed to certain hardware and software improvements in workstations which utilize virtual addressing in multi-user operating systems with write back caches, including operating systems which allow each user to have multiple active processes. In this connection, for convenience the invention will be described with reference to a particular multi-user, multiple active processes operating system, namely the Unix operating system. However, the invention is not limited to use in connection with the Unix operating system, nor are the claims to be interpreted as covering an invention which may be used only with the Unix operating system.

In a Unix based workstation, system performance may be improved significantly by including a virtual address write back cache as one of the system elements. However, one problem which arises in such systems is in the support of alias addresses, i.e., two or more virtual addresses which map to the same physical address in real memory.

The problem arises because any data update into a write back cache which is made through one alias address will not be seen through a cache access to the alias address, since the two alias addresses will not match.

More specifically, virtual addressing allows aliasing, i.e., the possibility of multiple virtual addresses mapping to the same physical address. If a direct mapped, virtual address write back cache were used in a system without page mapping restrictions, any two arbitrary virtual addresses could occupy any two arbitrary cache locations and still map to the same physical address. When cache blocks are modified, in general, it is impossible to check between arbitrary cache locations for data consistency. Data can become insistent when changes at one cache location are not seen at another cache location. Ultimately, the data at the common physical address in main memory will include only part of the modifications made by the CPU or I/O device into the several cache locations.

In the present invention, the foregoing problem is solved by combining two distinct strategies to handling aliases.

The first strategy is to create alias addresses so that their low order address bits are identical, modulo the size of the cache (as a minimum). This strategy is applicable to all user programs which use alias addressees generated by the kernel, or wholly within the kernel. These alias addresses for this strategy are generated by modifications to the kernel and are invisible to user programs. The alias addresses so generated will map to the same cache block within a direct mapped (one-way set associative) cache, or within the same cache set within a multi-way set associative cache. Alias hardware detection logic is then used to guarantee data consistency within this cache block (or cache set).

The second strategy covers those alias addresses in the operating system, rather than user program, which cannot be made to match in their lower order address bits. These are handled by assigning the pages as "Don't Cache" pages in the memory management unit (MMU) employed by workstations which utilize virtual addressing.

BRIEF DESCRIPTION OF THE DRAWINGS

FIG. 7d is a flow diagram of a state machine implementation for the data path during a CPU write bus cycle when the MMU indicates a Don't Cache Page.

DETAILED DESCRIPTION OF THE INVENTION

Figure 1:
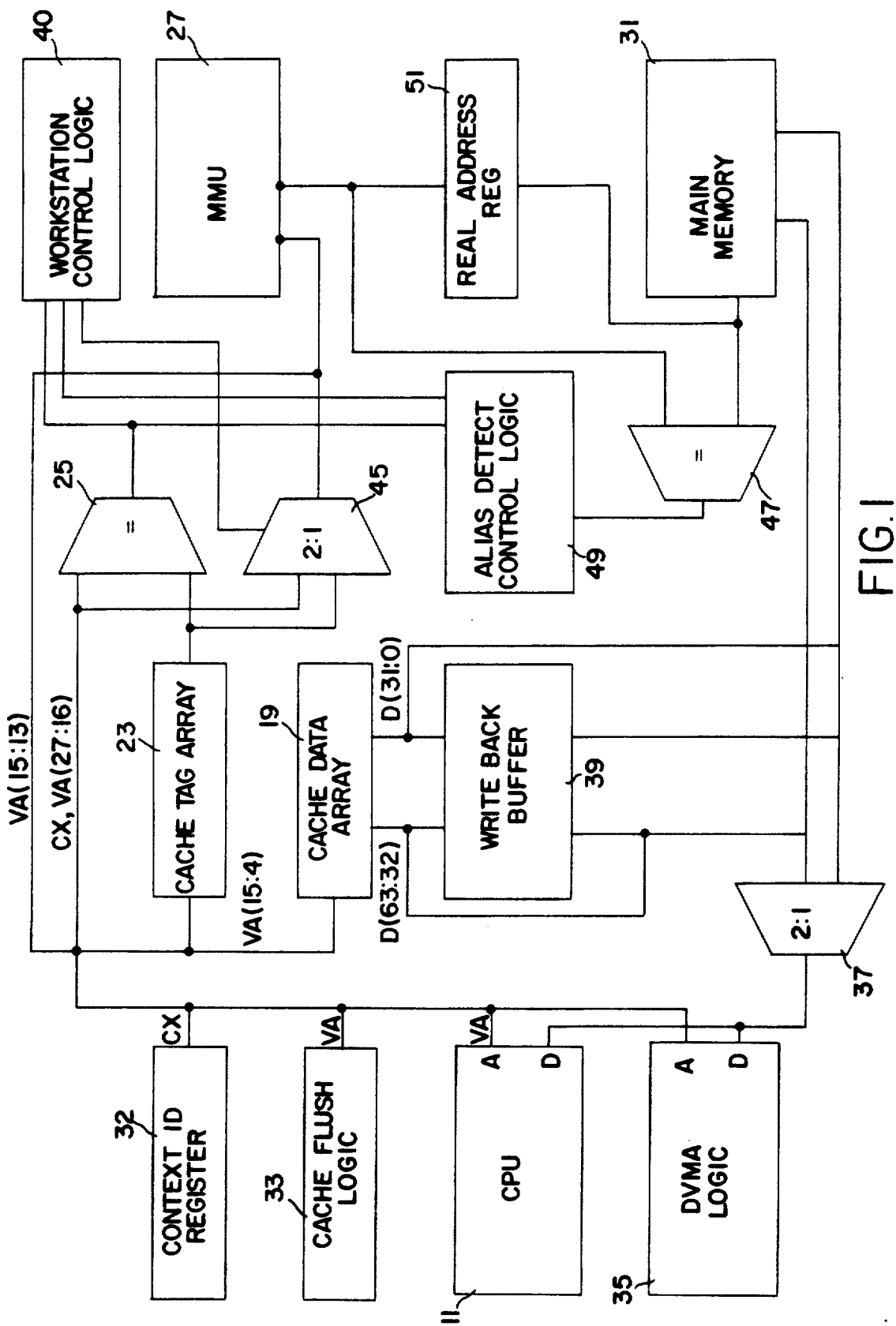
FIG. 1 is a block diagram showing the main components of a workstation utilizing virtual addresses with write back cache.

FIG. 1 shows the functional blocks in a typical workstation using virtual addresses in which the present invention is implemented.

Specifically, such a workstation includes a microprocessor or central processing unit (CPU) 11, cache data array 19, cache tag array 23, cache hit comparator 25, memory management unit (MMU) 27, main memory 31, write back buffer 39 and workstation control logic 40. Such workstations may, optionally, also include context ID register 32, cache flush logic 33, direct virtual memory access (DVMA) logic 35, and multiplexor 37.

In addition to the foregoing elements, to implement the present invention, also needed are multiplexor 45, alias detect logic 47, alias detect control logic 49 and real address register 51. The foregoing elements support alias addresses without the problems inherent in prior art implementations utilizing a virtual address write back cache.

Each of the foregoing workstation elements will now be described, including changes which must be made to the operating system kernel, with particular emphasis on the components unique to the present invention.

Description of Necessary Elements of Workstation

CPU 11 issues bus cycles to address instructions and data in memory (following address translation) and possibly other system devices. The CPU address itself is a virtual address of (A) bits in size which uniquely identifies bytes of instructions or data within a virtual context. The bus cycle may be characterized by one or more control fields to uniquely identify the bus cycle. In particular, a Read/Write indicator is required, as well as a "Type" field. This field identifies the memory instruction and data address space as well as the access priority (i.e., "Supervisor" or "User" access priority) for the bus cycle. A CPU which may be utilized in a workstation having virtual addressing and capable of supporting a multi-user operating system is a MC68020.

Another necessary element in a virtual address workstation with write back cache shown in FIG. 1 is virtual address cache data array 19, which is organized as an array of $2^N$ blocks of data, each of which contains $2^M$ bytes. The $2^M$ bytes within each block are uniquely indemnified with the low order M address bits. Each of the $2^N$ blocks is uniquely addressed as an array element by the next lowest N address bits. As a virtual address cache, the (N+M) bits addressing bytes within the cache are from the virtual address space of (A+C) bits. (The (C) bits are context bits from optional context ID register 32 described below.) The (N+M) bits include, in general, the (P) untranslated page bits plus added virtual bits from the (A+C−P) bits defining the virtual page address.

Virtual address cache data array 19 described herein is a "direct mapped" cache, or "one way set asociative" cache. While this cache organization is used to illustrate the invention, it is not meant to restrict the scope of the invention which may also be used in connection with multi-way set associative caches.

Figure 3:
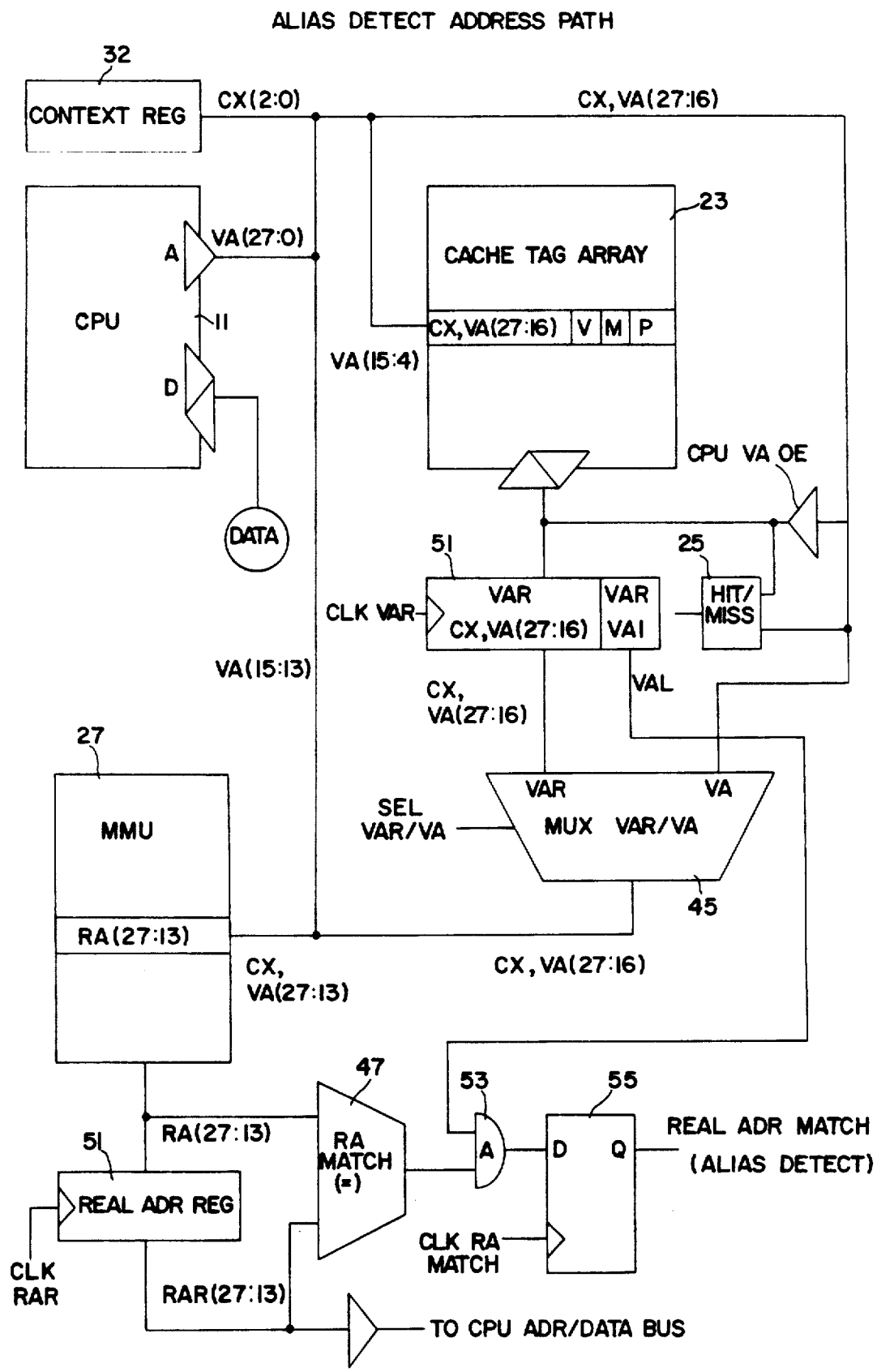
FIG. 3 is a detailed block diagram showing the address path utilized by the alias detection logic of the present invention.

Another required element shown in FIG. 1 is virtual address cache tag array 23 which has one tag array element for each block of data in cache data array 19. The tag array thus contains $2^N$ elements, each of which has a Valid bit (V), a Modified bit (M), two protection bits (P) consisting of a Supervisor Protect bit (Supvsr Prot) and a Write Allowed bit, and a virtual address field (VA, and optionally CX) as shown in FIG. 3. The contents of the virtual address field, together with low order address bits used to address the cache tag and data arrays, uniquely identify the cache block within the total virtual address space of (A+C) bits. That is, the tag virtual address field must contain ((A+C)−(M+N)) virtual address bits.

Cache "Hit" logic 25 compares virtual access addresses with the contents of the virtual address cache tag address field. Within the access address, the lowest order M bits address bits within a block; the next lowest M bits address a block within the cache; and the remaining ((A+C)−(M+N)) bits compare with the tag virtual address field, as part of the cache "hit" logic.

Figure 2A:
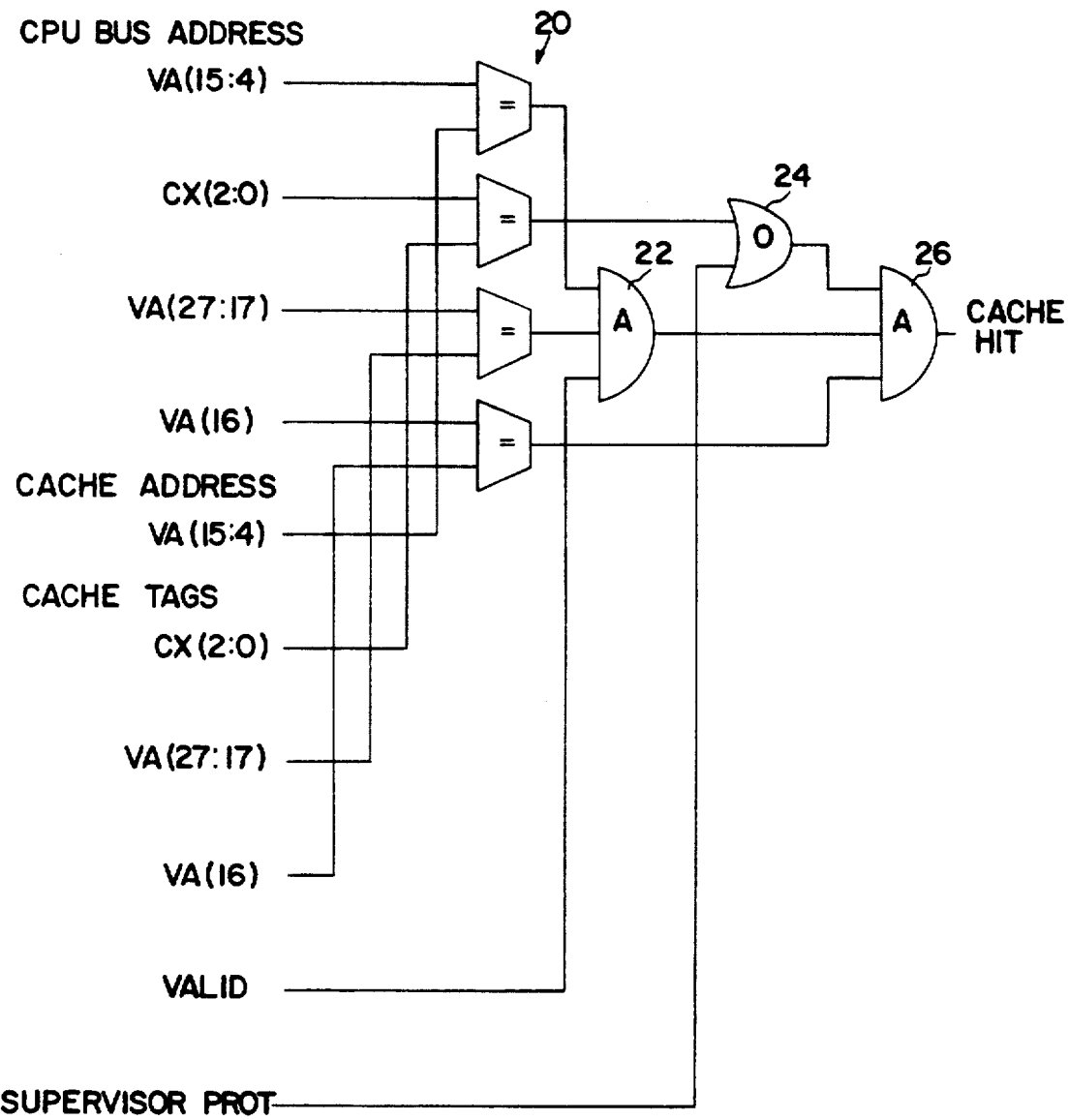
FIG. 2a is a schematic diagram of cache "hit" logic 25.

The cache "hit" logic must identify, for systems with a shared operating system, accesses to user instructions and data, and to supervisor instructions and data. A "hit" definition which satisfies these requirements is illustrated in FIG. 2a which comprises comparators 20, AND gate 22, OR gate 24 and AND gate 26.

MMU 27, which translates addresses within the virtual space into a physical address, is another required element. MMU 27 is organized on the basis of pages of size ($2^P$) bytes, which in turn are grouped as segments of size ($2^S$) pages. Addressing within a page requires (P) bits. These (P) bits are physical address bits which require no translation. The role of MMU 27 is to translate the virtual page address bits ((A+C−P) or (A−P)) into physical page addresses of (MM) bits. The composite physical address is then (MM) page address bits with (P) bits per page.

MMU 27 is also the locus for protection checking, i.e., comparing the access bus cycle priority with the protection assigned to the page. To illustrate this point, there are two types of protection that may be assigned to a page namely, a Supervisor/User access designator and a Write Protect/Write Allowed designator. Although the subject invention is not limited to such types of protection, given this page protection, a "Protection Violation" can result if either a "User" priority bus cycle accesses a page with "Supervisor" protection; or if a "Write" bus cycle accesses a page with a "Write Protect" designation.

Figure 2B:
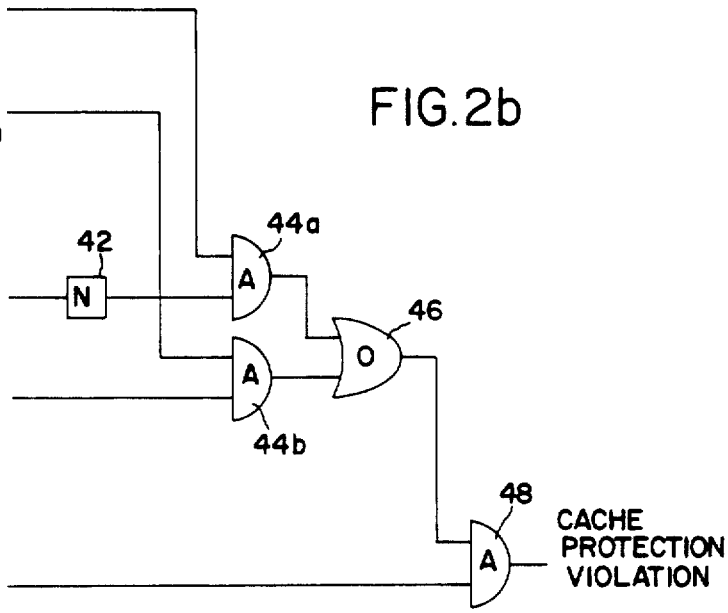
FIG. 2b is a schematic diagram of a circuit for detecting a cache protection violation.
Figure 2C:
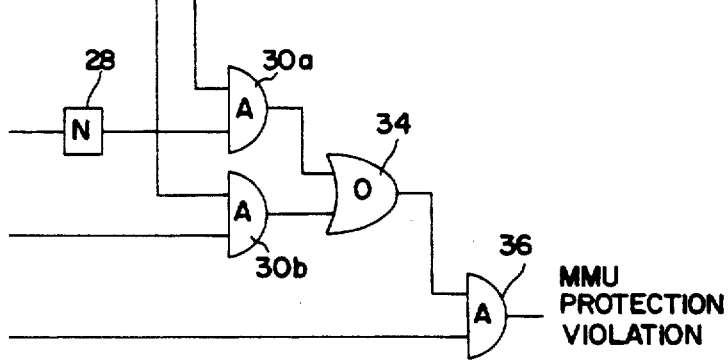
FIG. 2c is a schematic diagram of a circuit for detecting a MMU protection violation.

The application of MMU protection checking through the MMU is shown in FIG. 2c which comprises inverter 28, AND gates 30a and 30b, OR gate 34 and AND gate 36. In addition, with a virtual address write back cache, the concept of protection checking can be extended to cache only CPU cycles which do not access the MMU. Such cache only protection logic is shown in FIG. 2b comprising inverter 42, AND gates 44a and 44b, OR gate 46 and AND gate 48.

Also shown in FIG. 1 is main memory 31 which is addressable within the physical address space; control of main memory access is through workstation control logic 40.

Write back buffer 39 is a register containing one block of cache data loaded from cache data array 19. Write back buffer 39 is loaded whenever an existing cache block is to be displaced. This may be caused by a need to update the cache block with new contents, or because the block must be flushed. In either case, in a write back cache, the state of the cache tags for the existing cache block determine whether this block must be written back to memory. If the tags indicate that the block is valid and modified, as defined below, then the blocks contents must be written back to memory 31 when the cache block is displaced. Write back buffer 39 temporarily holds such data before it is written to memory.

Workstation control logic 40 controls the overall operation of the workstation elements shown in FIG. 1.

In the preferred embodiment, control logic 40 is implemented as several state machines which are shown in FIGS. 4 and 6–8 as will be described more fully below in conjunction with the description of alias detect control logic 49 which is also, in the preferred embodiment, integrated into the workstation control logic.

Description of Optional Elements of Workstation

Context ID register 32 is an optional external address register which contains further virtual address bits to identify a virtual context or process. This register, containing C bits, identifies a total of (2C) active user processes; the total virtual address space is of size 2(A+C).

An important component in this virtual address space of 2(A+C) bits is the address space occupied by the operating system. The operating system is common to all user processes, and so it is assigned to a common address space across all active user processes. That is, the (C) context bits have no meaning in qualifying the addresses of pages within the operating system. Rather, the operating system is assumed to lie within a common, exclusive region at the top of the (2A) bytes of virtual address space for each active context. No user pages may lie within this region. So the operating system page addresses for two distinct user processes are identical, while the user pages for the two processes are distinct. All pages within the operating system are marked as having "Supervisor" protection.

Workstations of the type in which the present invention may be utilized may also include cache flush logic 33 to remove selected blocks from the virtual cache when virtual addresses are to be reassigned. A complete description of one implementation of cache flush logic may be found in copending U.S. application Ser. No. 104,280 filed Oct. 2, 1987, now abandoned.

Cache flush logic 33 is described here only to indicate its role as a component in a virtual address, write back cache system. If a range of addresses (a virtual page address, for example) is to be reassigned, then all instances of addresses from within this range must be removed, or "flushed", from the cache before the new address assignment can be made. A cache block is "flushed" by invalidating the valid bit in its tags and writing the block back to memory, if the block has been modified.

In addition to CPU 11 as a source of bus cycles, the workstation may include one or more external Input-/Output (I/O) devices such as DVMA logic 35. These external I/O devices are capable of issuing bus cycles which parallel the CPU in accessing one or more "Types" of virtual address spaces. The virtual address from either the CPU 11 or DVMA logic 35, together with the address in context ID register 32, is referred to as the access address.

Another optional element is data bus buffer 37, which in the preferred embodiment is implemented as two buffers to control data flow between a 32 bit bus and a 64 bit bus. Such buffers are needed when the CPU data bus is 32 bits and the cache data array data bus is 64 bits.

Description of Elements Unique to the Invented Workstation

As noted above, in the present invention, two distinct strategies are utilized to solve the data consistency problems resulting from alias addresses. Both strategies require the interaction of the operating system with special cache hardware to ensure consistent data.

The first strategy requires that all alias addresses which map to the same data must match in their low order address bits to ensure that they will use the same cache location, if the data is to be cached. The present invention utilizes alias detection logic 47, which is a real address comparator, to detect alias addresses on memory access that "miss" the cache and to control the cache data update to ensure that all alias addresses point to consistent data within the same cache location.

The kernel address operation modules implementing this first strategy force alias addresses to match in their low order address bits, so that alias addresses will be guaranteed to use the same cache location. If the cache is of size $2^M$ blocks of data, each with $2^N$ bytes, then at least the low order (N+M) bits of the alias addresses must match. This applies to alias addresses within the same process as well as alias addresses between processes. So long as this requirement is met, in direct mapped caches, alias addresses map to the same cache block, and in multi-way set associative caches alias addresses will map to the same cache set. The second strategy prevents data from being cached through the use of a "Don't Cache" bit which is defined for each page in MMU 27. In other words, each page descripter in MMU 27 has a "Don't Cache" bit, which controls whether instructions and data from that page may be written into the cache. If this control bit is set for a page, then all data access to this page are made directly to and from main memory bypassing the cache. In bypassing the cache, the virtual cache data consistency problem is avoided.

Since alias addressing is possible, if a page is marked "Don't Cache" in one MMU page entry, then it must be marked "Don't Cache" in all alias page entries. Data consistency is not guaranteed otherwise.

Alias address generation for user processes is controlled through the kernel, so that all user processes utilize the first strategy to ensure data consistency among alias addresses. Some addresses for the operating system, however, cannot be altered to meet the addressing requirements of the first strategy. These system alias addresses are handled instead by the second strategy, assignment to "Don't Cache" pages.

The following is a functional description of what is needed to produce data consistency in a direct mapped virtual address, write back cache, using a combination of the two strategies.

If a CPU 11 or DVMA 35 memory access cycle "misses" the cache, then the access virtual address will be translated by the MMU. The MMU transition will determine if the accessed page is a "Don't Cache" page and whether the access has a protection violation. If the access is valid and to a cacheable page, then the cache will be updated with the cache block corresponding to the access address.

The current contents of the cache at the location corresponding to the access address must be examined to detect a possible alias address. If the current cache block is valid and modified, then the translated address of the cache block must be compared to the translated access address to determine the source of valid data to update the cache.

The real address comparison performed by alias detection logic 47 takes as inputs the translated bus cycle access address form real address register 51 and the translated cache address from MMU 27.

If the current cache block is valid, and the translated addresses compare, then the access address and cache block address are aliases. If the cache block is modified, then the current cache data is the most current data, and the main memory data at this address is stale.

If the translated addresses compare but the cache block is not modified, then the old cache data and memory data are identical, and either can be used as the source for the cache update.

Once the source of valid block data has been determined, the access cycle can be completed. On Read cycles, the bus cycle returns data either directly from the source or from the cache following the cache update, depending on the implementation. On Write cycles, the access data may be written into the cache. Both the size of cache updates and cache data alignment are implementation dependent.

To guarantee data consistency, any write to a page requires that all references to that page (read or write) adhere to this restriction. No requirement is placed on alias addressing to read only pages.

The preferred embodiment for the address path incorporating alias detection logic 47 is shown in FIG. 3. As shown in FIG. 3, the address path includes the fundamental elements to support address control in a virtual address write back cache. For alias address support, also needed are a virtual address register 52 (VAR) for the virtual address (CX and VA) and cache block Valid bit (V), multiplexer 45 which multiplexes the virtual address and virtual address register, real address register 51, alias detect logic 47, AND gate 53 (with the Valid bit from the VAR and the alias detect logic output as inputs), and Real Address Match flip-flop 55 which is set when a real address match is detected.

The data path from the cache 19 to main memory 31 is over two 64 bit busses 56 and 58. The CPU data path 60 is 32 bits, indicated as D(31:0). On read bus cycles, the cache address bit A(2) selects which of two 32 bit buffers 37 may enable data from the 64 bit cache data bus 56 onto the 32 bit CPU data bus 60. Alias detection logic 49 controls the source of the data on read cycle cache misses (the cache or memory) and whether the cache is updated with memory data on write cycle cache misses as described in the data state machine, FIGS. 6 and 7.

Figure 4A:
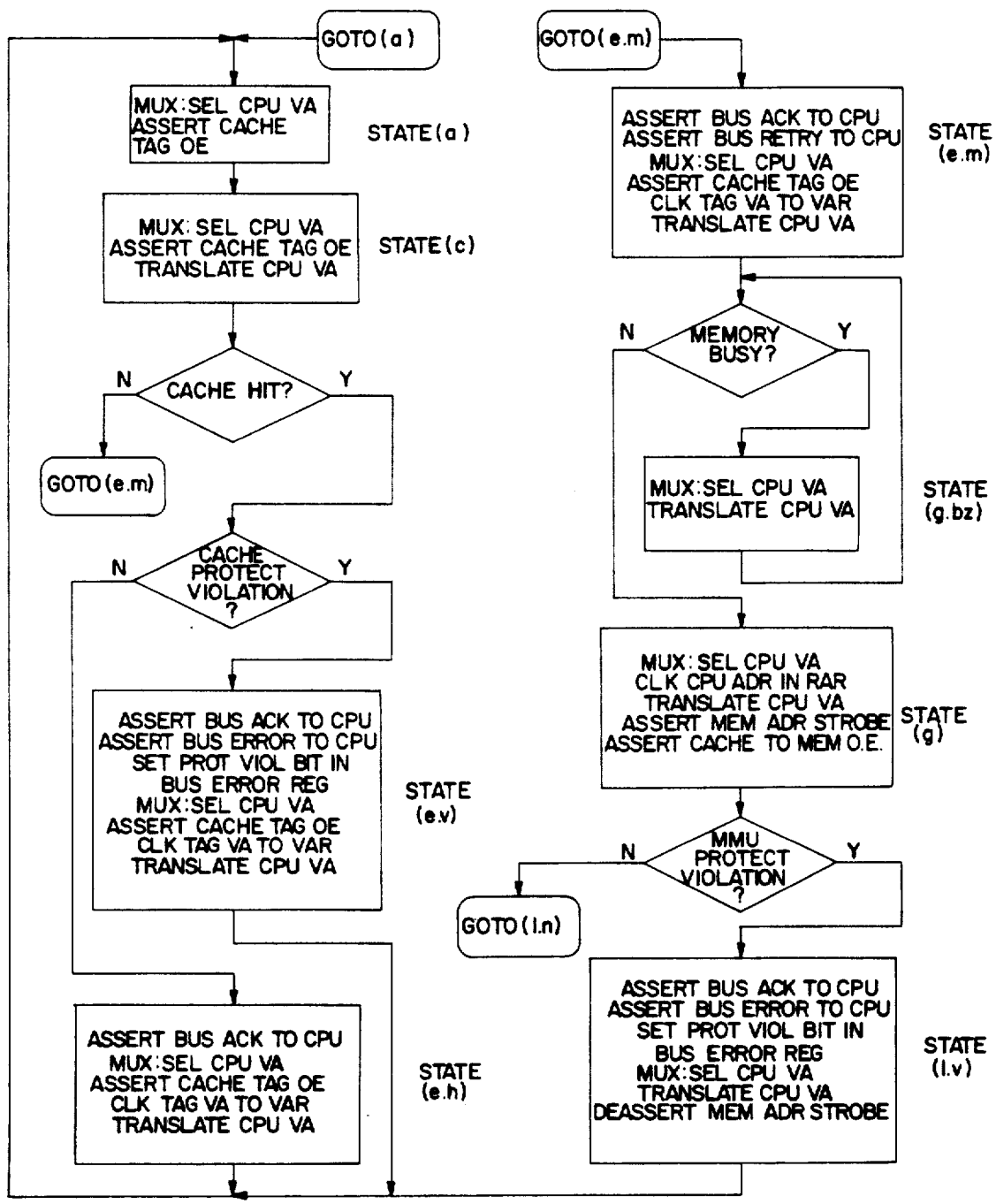
FIG. 4 (4(a), 4(b)) is a flow diagram of a state machine implementation for certain controls related to the addressing of a virtual address write back cache.
Figure 4B:
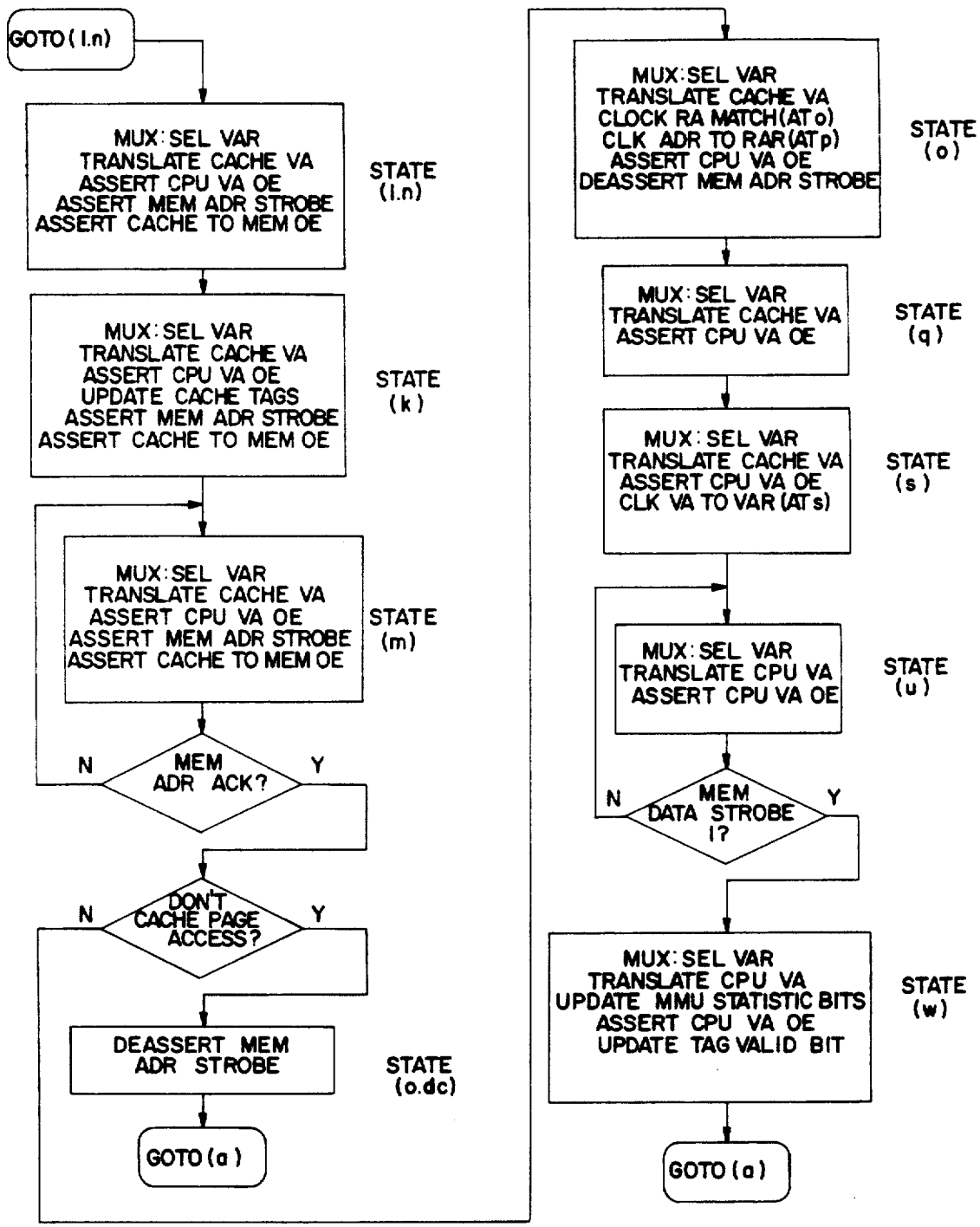
Figure 5:
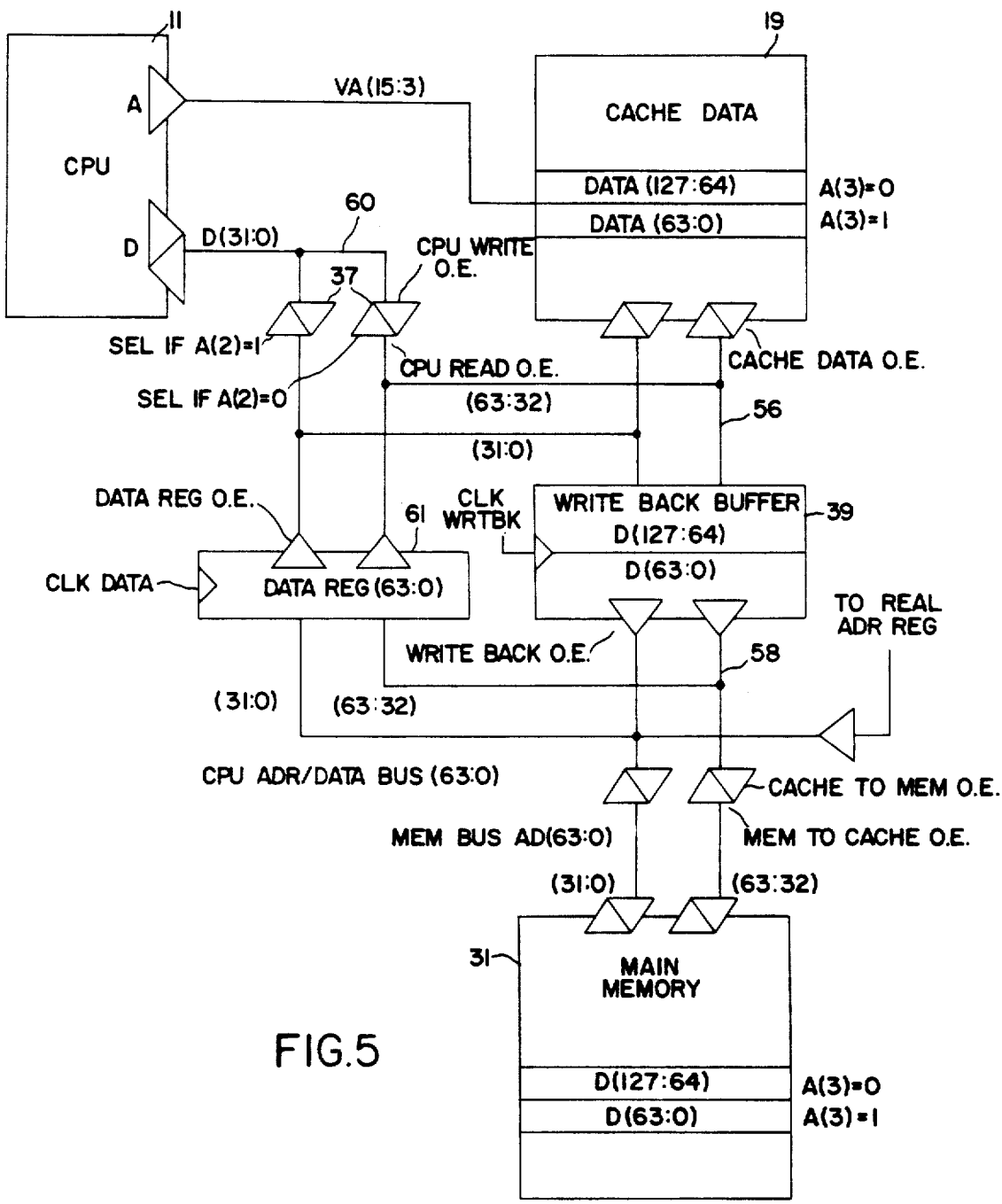
FIG. 5 is a detailed block diagram showing the data path utilized by the alias detection logic of the present invention.
Figure 6A:
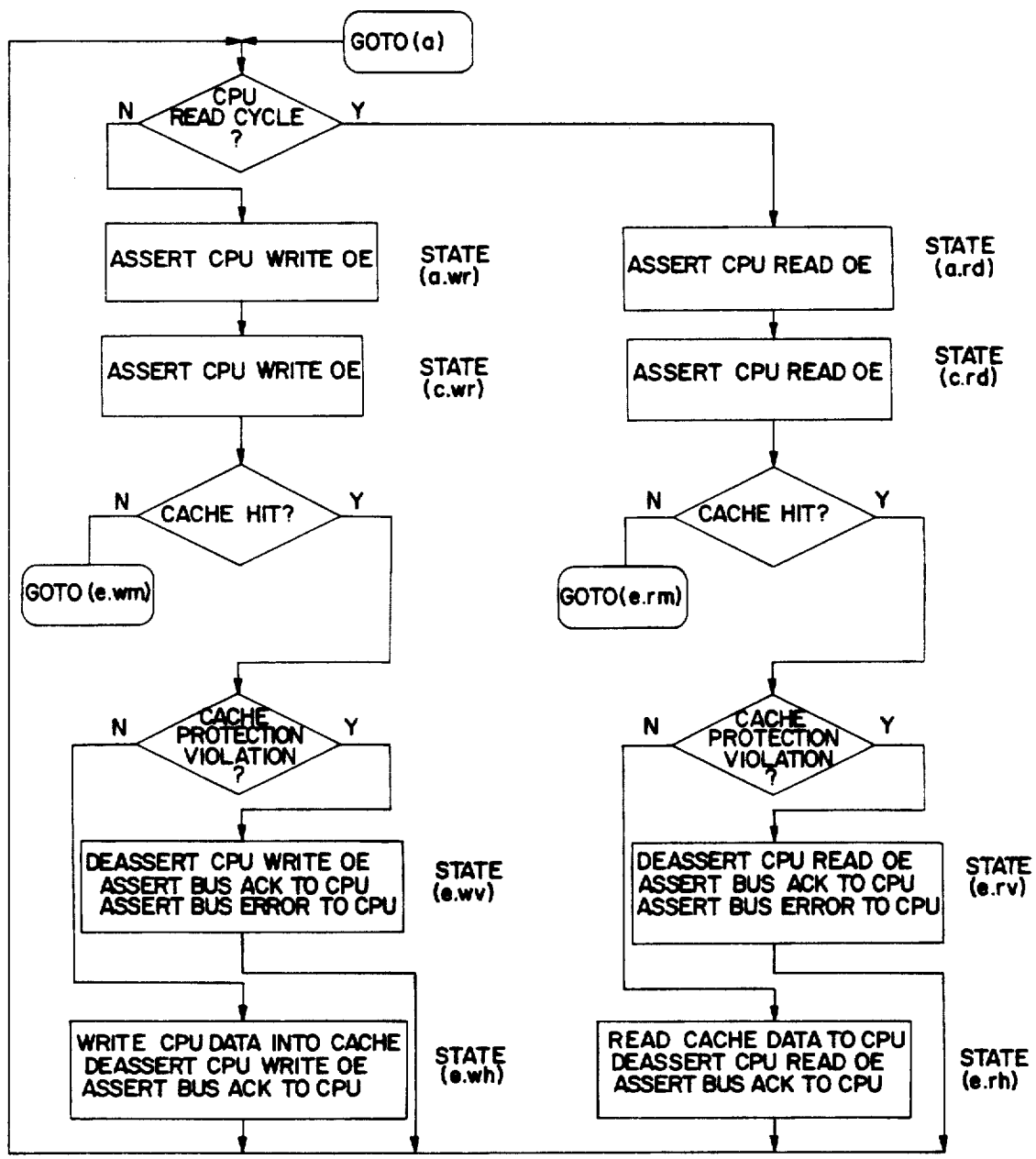
FIG. 6 (6(a), 6b)) is a flow diagram of a state machine implementation for certain controls related to data transfers to and from a virtual address write back cache (states (a)–(o)).
Figure 6B:
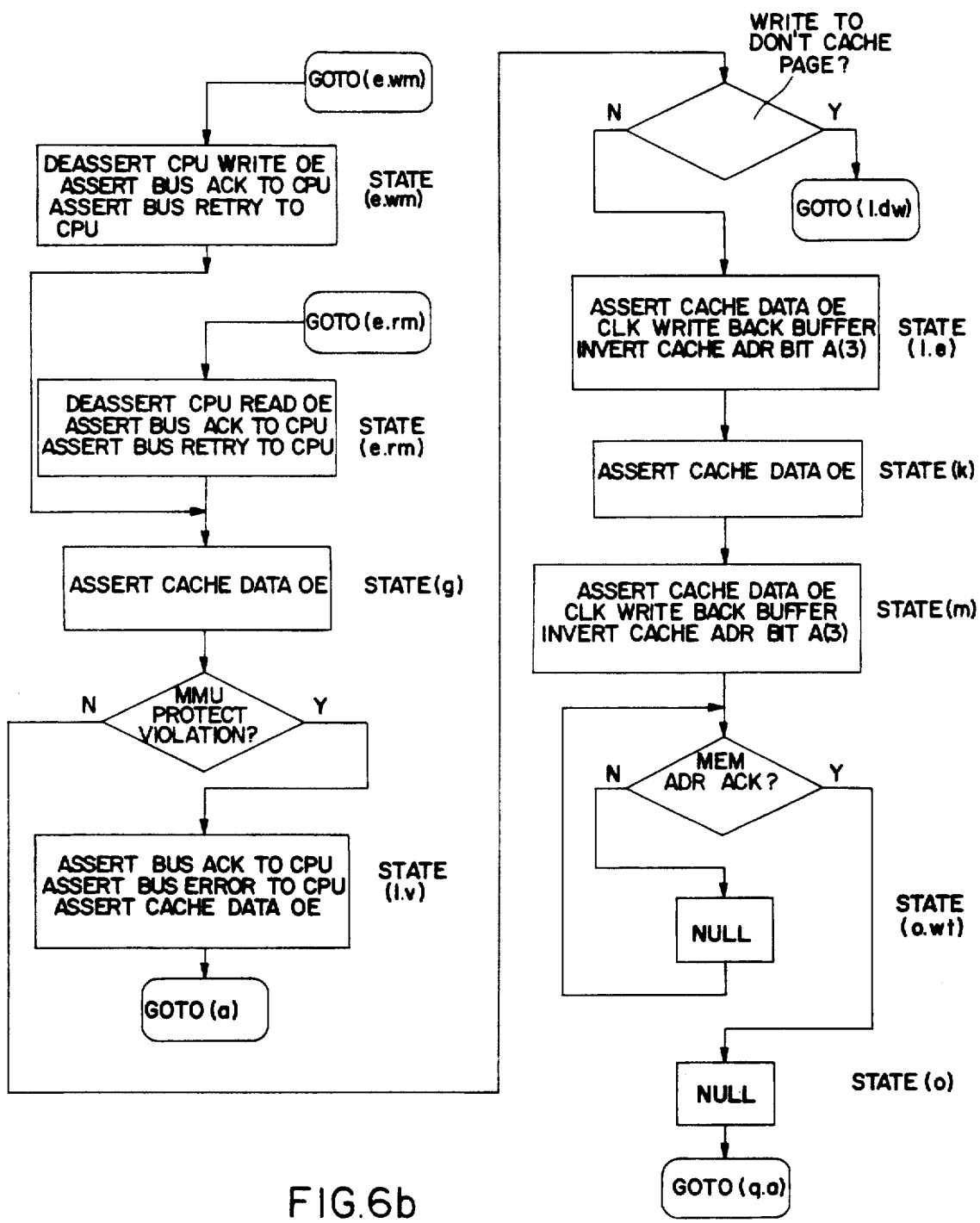
Figure 7A:
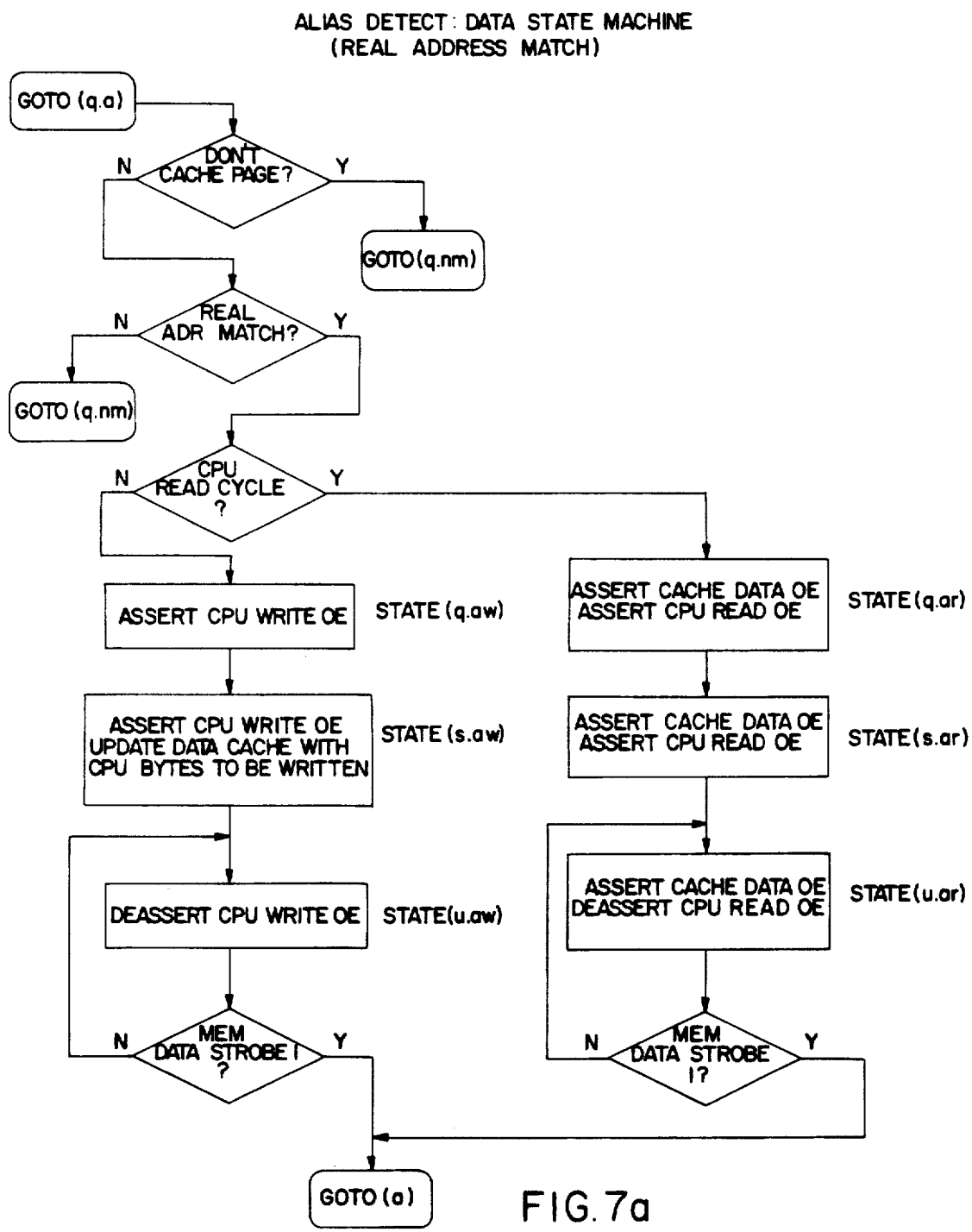
FIG. 7a is a flow diagram of a state machine implementation for the data path when there is a real address match (states (q)–(u)).
Figure 7B:
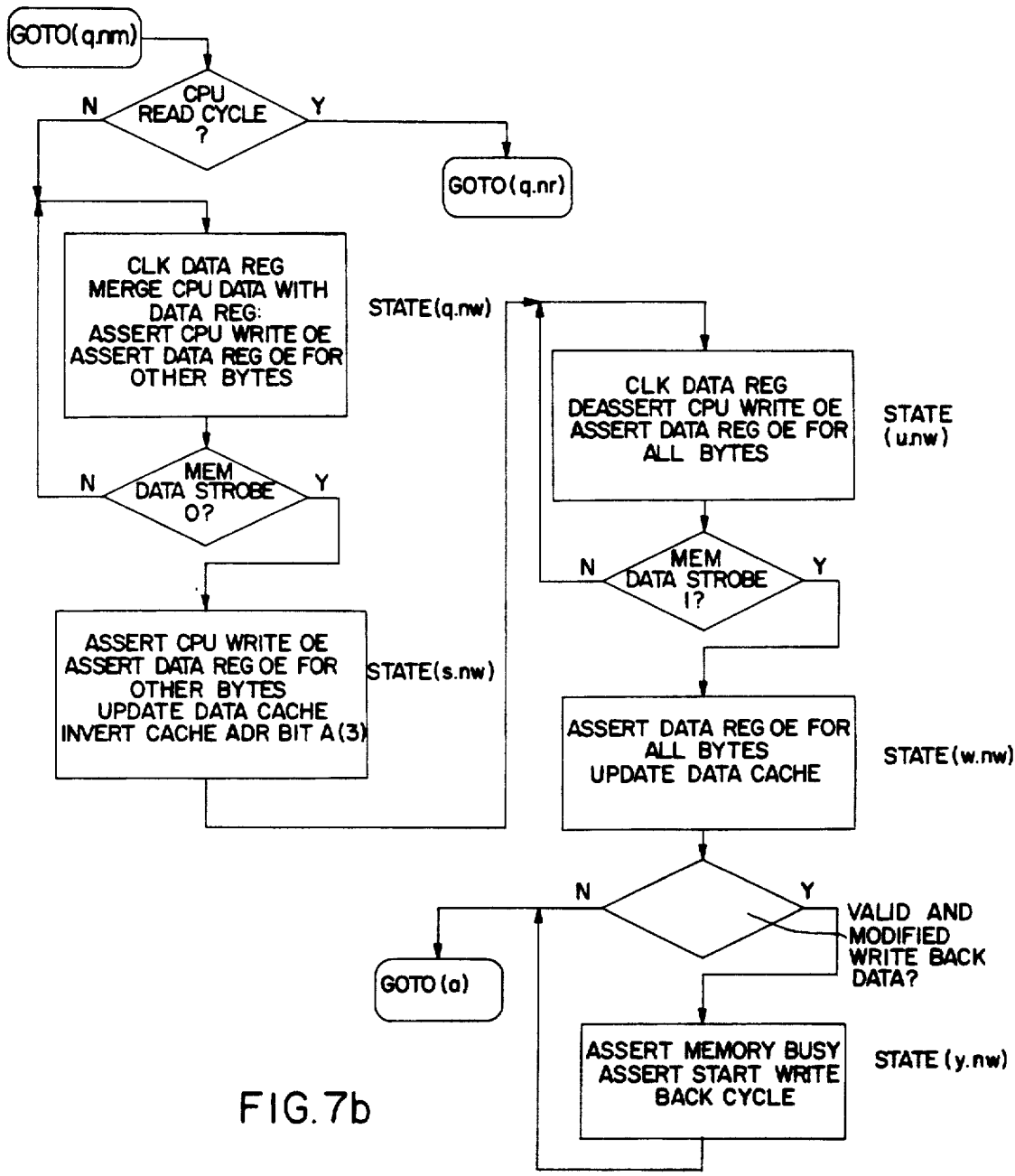
FIG. 7b is a flow diagram of a state machine implementation for the data path when there is no real address match during a CPU write bus cycle (states (q)–(y)).
Figure 7C:
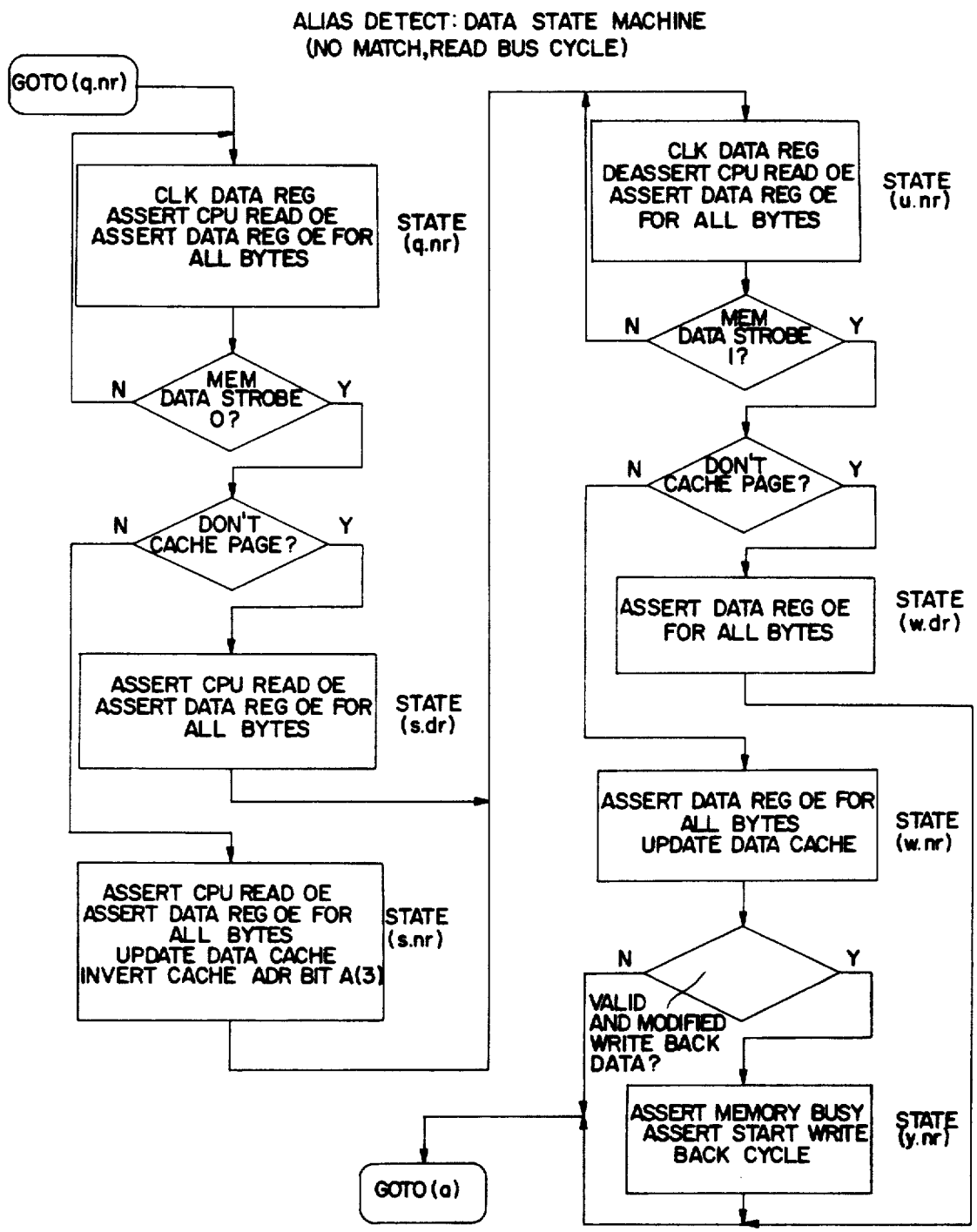
FIG. 7c is a flow diagram of a state machine implementation for the data path when there is no real address match during a CPU read bus cycle (states (q)–(y)).

In FIGS. 3 and 5, to avoid unnecessarily cluttering the Figures, not all control lines are shown. However, the control lines necessary for proper operation of the invention can be ascertained from the flow chart of the state machines shown in FIGS. 4 and 6-8.

In the flow charts, the following abbreviations are utilized:

MUX—multiplexor 45
Sel—select
VA—virtual address
RA—real address
OE—output enable
Ack—acknowledge
Cache Hit?—Did cache "hit" logic 25 detect a cache hit? (FIG. 2a)
Cache Protect Violation?—Did control logic 40 detect a detect a cache protect violation? (FIG. 2b)
Memory Busy?—Has Memory Busy been asserted?
MMU Protect Viol?—Did control logic 40 detect a MMU protect violation? (FIG. 2c)
RAR—real address register 51
CLK—clock
Adr—address
Mem Adr Strobe—memory 31 address strobe
VAR—virtual address register 52
Mem Adr Ack?—Has a memory address acknowledge been asserted by memory 31?
Mem Data Strobe 0?—Has memory data strobe 0 been asserted?
Mem Data Ack 0?—Has memory data acknowledge 0 been asserted?
Mem Data Strobe 1?—Has memory data strobe 1 been asserted?
Mem Data Ack 1?—Has memory data acknowledge 1 been asserted?
Clk Write Back Buffer—clock write back buffer 39
Real Adr Match?—Has a real address match been detected (flip-flop 55)
Don't Cache Page?—Has control logic 40 detected a Don't Cache Page from MMU 27
CPU Read Cycle?—Is CPU 11 in a read cycle
Clk Data Reg—clock data register 61
Valid and Modified Write—Has control logic 40 detected Back Data?Valid bit (V) and Modified bit (M)
Write to Don't Cache Page—Has control logic 40 detected a CPU write to a Don'5 Cache Page?
Start No Cache Write?—Has control logic 40 asserted Start No Cache Write?
Start Write Back Cycle?—Has control logic 40 asserted Start Write Back Cycle Similar abbreviations are used in the timing diagrams of FIGS. 9-11.

The address state machine shown in FIGS. 4a and 4b defines certain of the controls related to the address handling portion of the cache. The invention is integrated through the clocking of the Real Address Match flip-flop 55 at state (o). The cache tags 23 are written as Valid during state (w), following a successful transfer of all block data from memory 31.

The data state machine shown in FIGS. 6a and 6b and 7a-7d defines certain controls related to the data transfer portion of the cache. As illustrated, following state (g), a test is made for a write to a Don't Cache Page; the handing of this write to memory is also described in the path following state (i.dw) in the data state machine. Following state (o), a test is made for a Don't Cache Page access (this time for Read data). The Don't Cache Read control takes the same path as the No-Real Address Match path, until states (q.nr) and (u.nr). Here a test for Don't Cache Pages inhibits cache updates in states (s.nr) and (w.nr).

Figure 8:
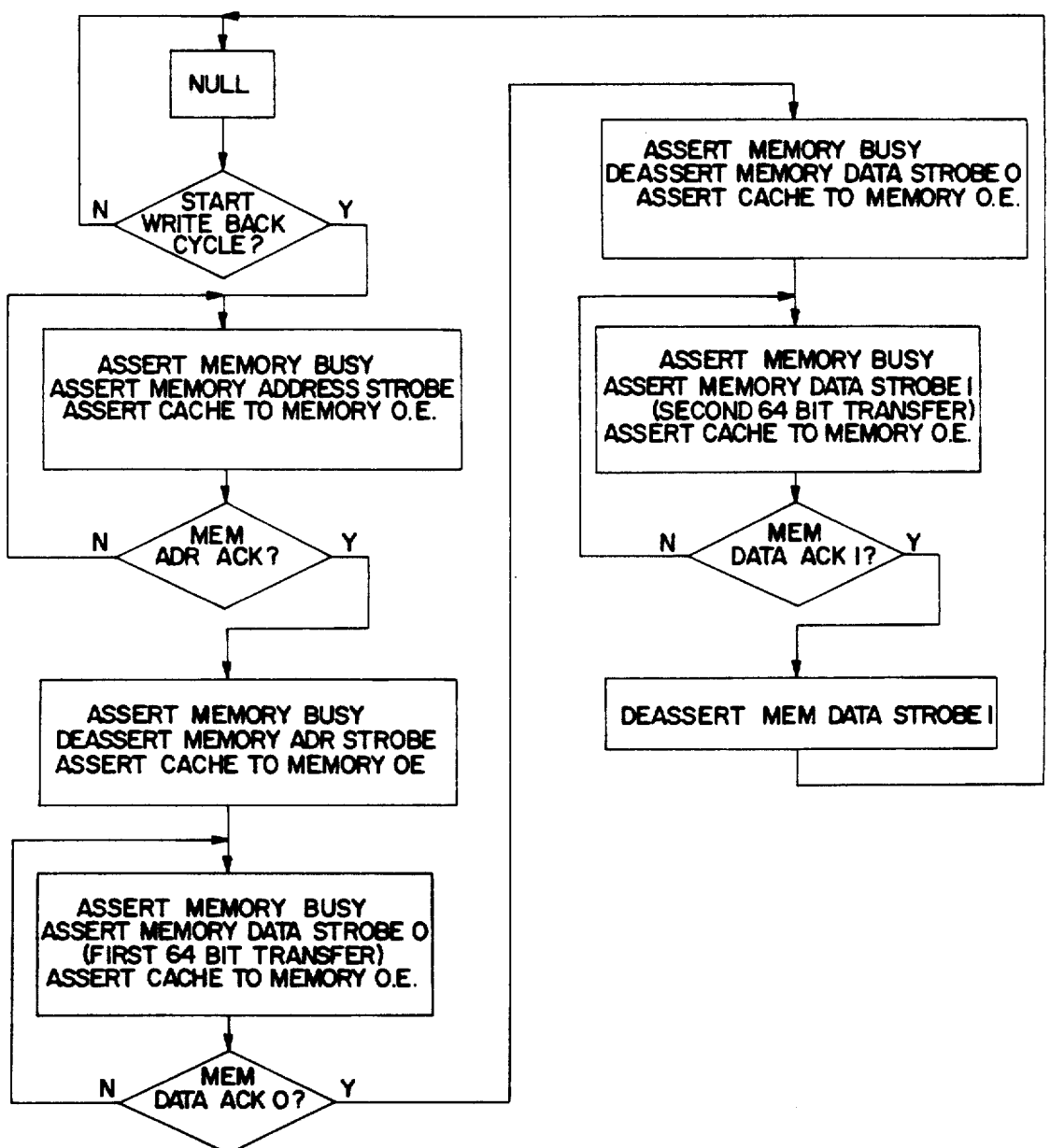
FIG. 8 is a flow diagram of a state machine implementation for controlling Write Back bus cycles to memory.

The write back state machine shown in FIG. 8 defines the control of the Write Back bus cycle to memory. This cycle may be performed in parallel with CPU cache accesses, since both the Write Back controls and data path are independent of the cache access controls and data path. As described below, the "Memory Busy" signal causes address and data state machines to wait until a previous Write Back cycle has completed.

Figure 9A:
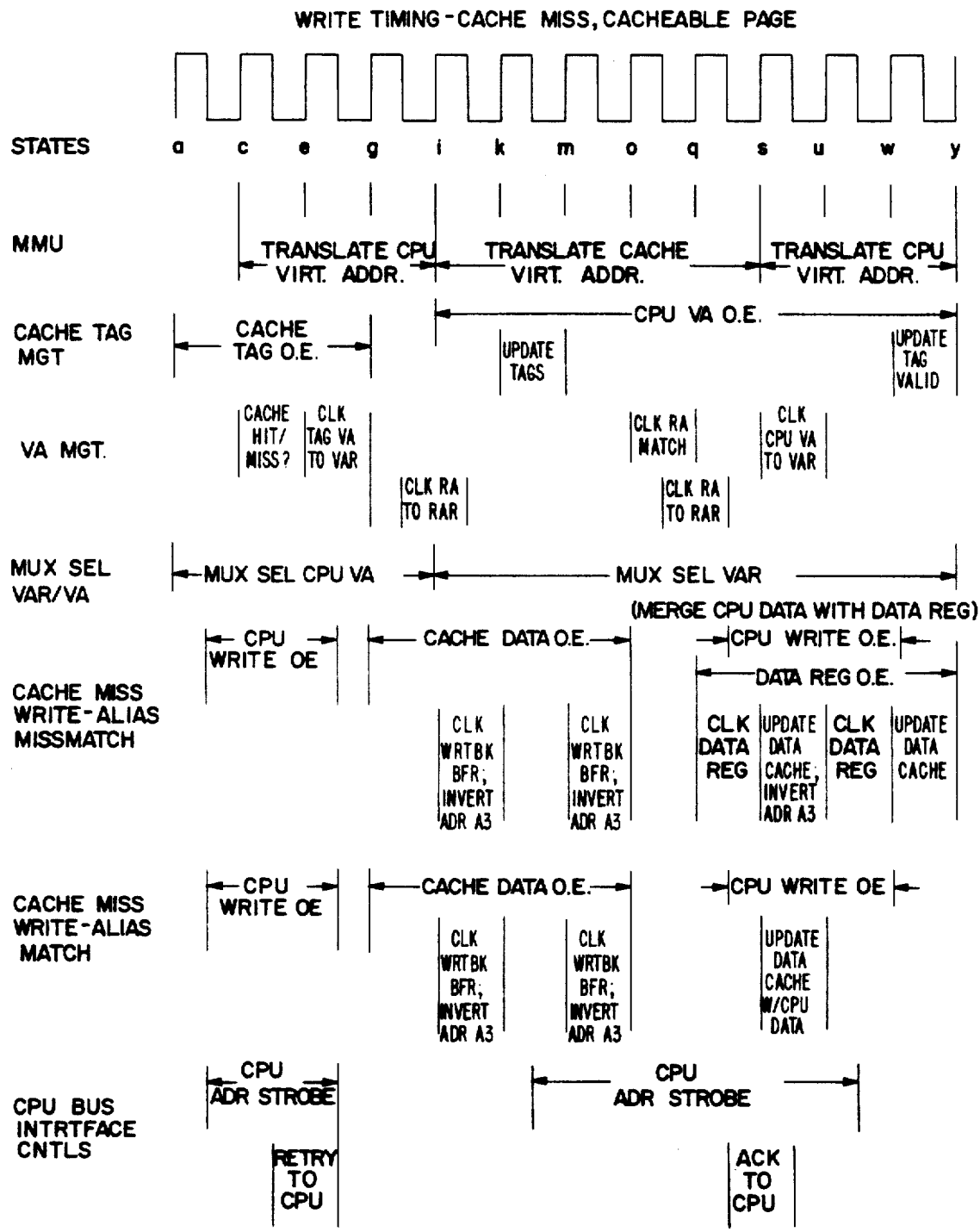
FIG. 9a is a timing diagram for the best case timing for a CPU write bus cycle when the MMU indicates a cacheable page.

The write cache miss timing diagram shown in FIG. 9a defines the overall timing of a CPU write bus cycle to a cacheable page in memory which misses the cache. The cache Hit and Protection Check occur in cycle (c) in this diagram.

A part of the miss handling sequence includes the loading of the current cache block which is being replaced into write back buffer 39 in cycles (i) and (m). The translated address for the current cache block is also loaded into real address register 51 in cycle (o). The Real Address Match latch (flip-flop 55) is also clocked at cycle (o). If the current cache block is both Valid and Modified from a previous CPU (or DVMA) write cycle, then this cache block will be written back to memory 31 through a Write Back bus cycle, described in both the Memory Data Bus Timing and the Write Back State Machine, FIGS. 11b and 8 respectively.

An active Real Address Match latch (flip-flop 55) signifies an alias address match. If there is no Alias Match, the CPU write data is merged with block data returned from memory on the first data transfer of a Block Read memory bus cycle. During cycles (q) through (u), the CPU Write Output Enable controlling buffers 37 will be active for only those bytes to be written by the CPU, while the Data Register Output Enable controlling data register 61 will be active for all other bytes. During the second data transfer, cycle (w), the Data Register Output Enables for all bytes will be active.

If there is an Alias Match, the CPU data is written into the data cache at state (s), and the data from memory 31 is ignored.

Figure 9B:
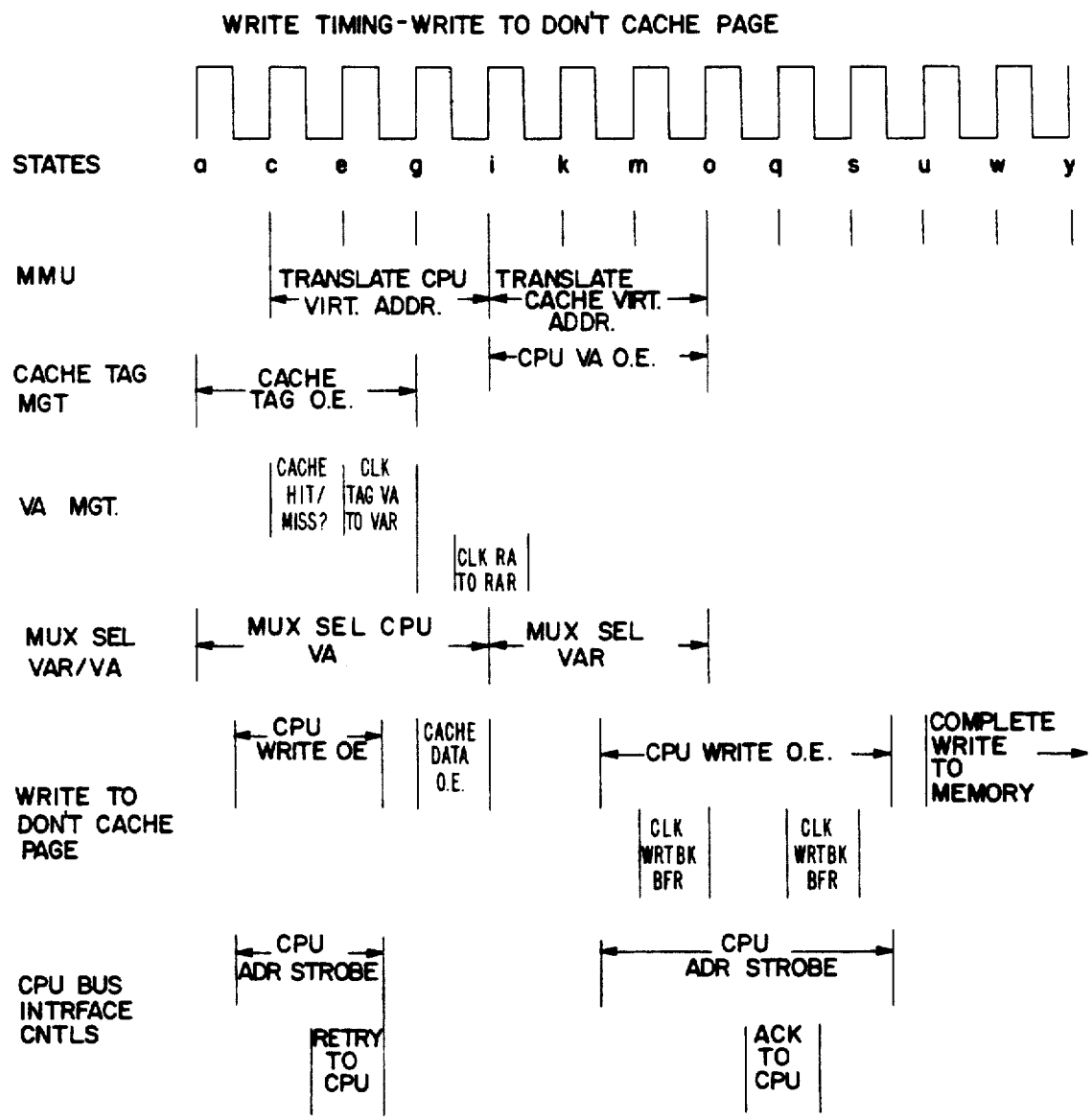
FIG. 9b is a timing diagram for the best case timing for a CPU write bus cycle when the MMU indicates a Don't Cache page.

The Write to Don't Cache Page timing shown in FIG. 9b defines the overall timing of a CPU write bus cycle to memory for accesses to a Don't Cache Page. The cache Hit, which occurs in cycle (c), will always indicate a miss (no Hit).

The Write to Don't Cache page case differs from the cache miss case for a write to a cacheable page in that the cache is not updated with either CPU or memory data. The implementation uses a special memory bus cycle, called the Write to Don't Cache Page cycle (FIG. 11c), to directly update memory. Not that the Real Address Match latch has no meaning for this case.

Figure 10A:
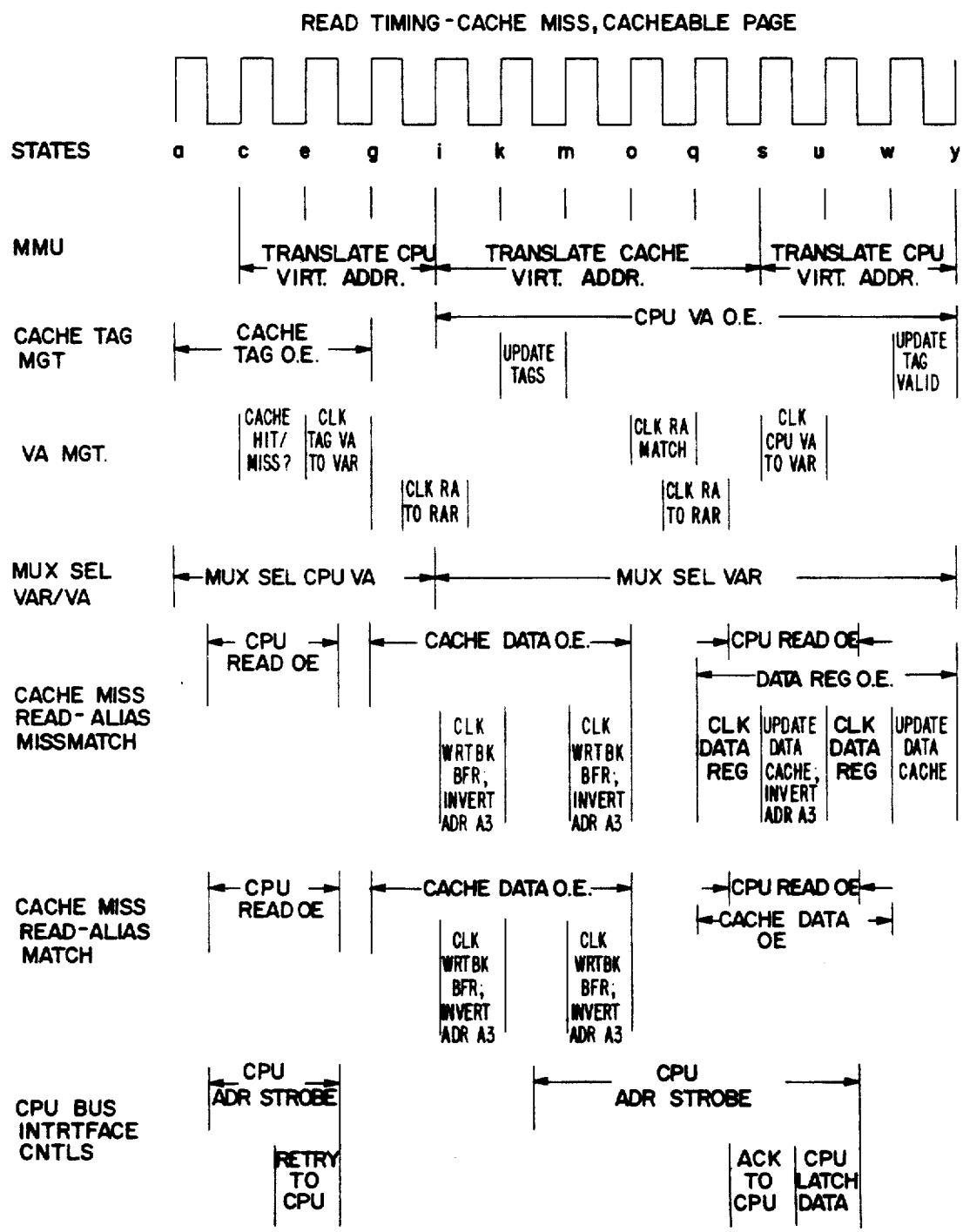
FIG. 10a is a timing diagram for the best case timing for a CPU read bus cycle when the MMU indicates a cacheable page.

The read cache miss timing diagram shown in FIG. 10a defines the overall timing of a CPU read bus cycle to a cacheable page in memory which misses the cache. The cache Hit and Protection Check occur in cycle (c) in this diagram.

A part of the miss handling sequence includes the loading of the current cache block which is being replaced into write back buffer 39 in cycles (i) and (m). The translated address for the current cache block is also loaded into real address register 51 in cycle (o). The Real Address Match latch (flip-flop 55) is also clocked at cycle (o). If the current cache block is both Valid and Modified from a previous CPU (or DVMA) write cycle, then this cache block will be written back to memory 31 through a Write Back bus cycle, described in both the Memory Data Bus Timing and the Write Back State Machine, FIGS. 11b and 8 respectively.

An active Real Address Match latch (flip-flop 55) signifies an alias address match. If there is no alias address match, data is read to the CPU by simultaneously bypassing the data to the CPU through buffers 37 enabled by control signal CPU Read Output Enable, active in states (q) through (u), and updating the cache, in state (s). The memory is designed to always return the "missing data" on the first 64 bit transfer, of a Block Read memory bus cycle and the alternate 64 bits on the subsequent transfer. After the CPU read bus cycle data is returned, the CPU may run internal cycles while the cache is being updated with the second data transfer from memory.

If there is an alias address match, data is read directly from the cache 19 to the CPU 11, and the data from memory 31 is ignored.

Figure 10B:
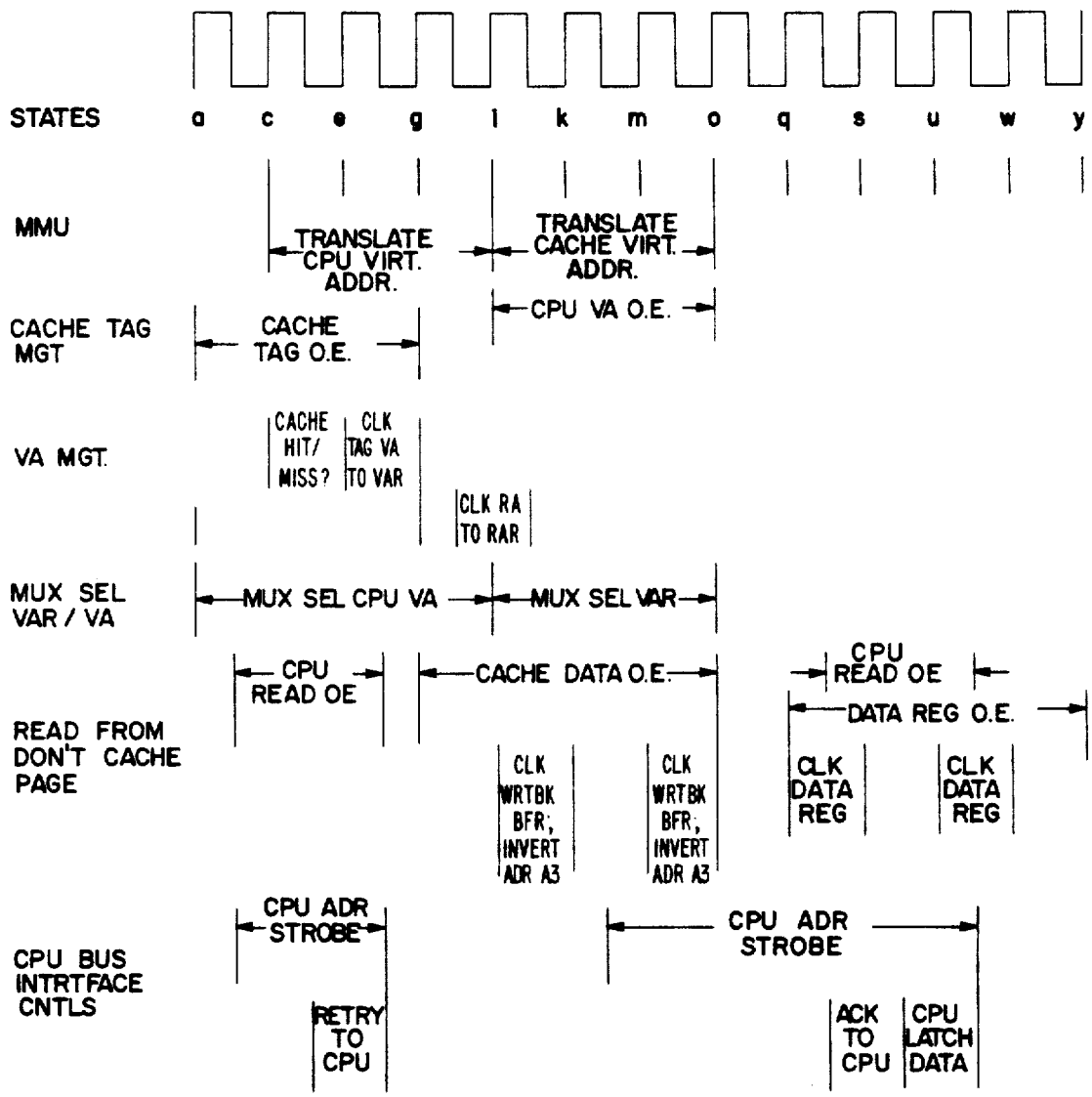
FIG. 10b is a timing diagram for the best case timing for a CPU read bus cycle when the MMU indicates a Don't Cache page.

The Read from Don't Cache Page timing shown in FIG. 10b defines the overall timing of a CPU read bus cycle to memory for accesses to a Don't Cache Page. The cache Hit, which occurs in state (c), will always indicate a miss (no Hit).

The Read from a Don't Cache Page case differs from the cache miss case for reading from a cacheable page in that the cache is not updated with memory data. The implementation uses the same Block Read memory bus cycle as the cache miss case (see the Memory Data Bus Timing, below). The Real Address Match latch (flip-flop 55) has mo meaning for this case.

Figure 11A:
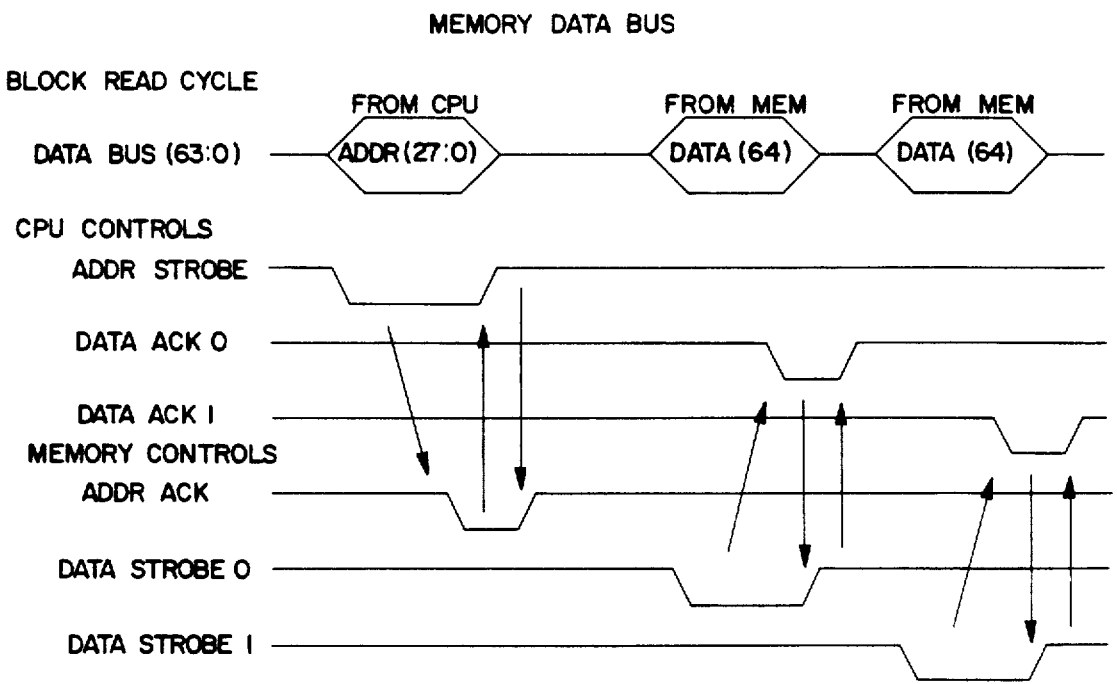
FIG. 11a is a timing diagram of the memory bus cycle for performing a block read cycle.
Figure 11B:
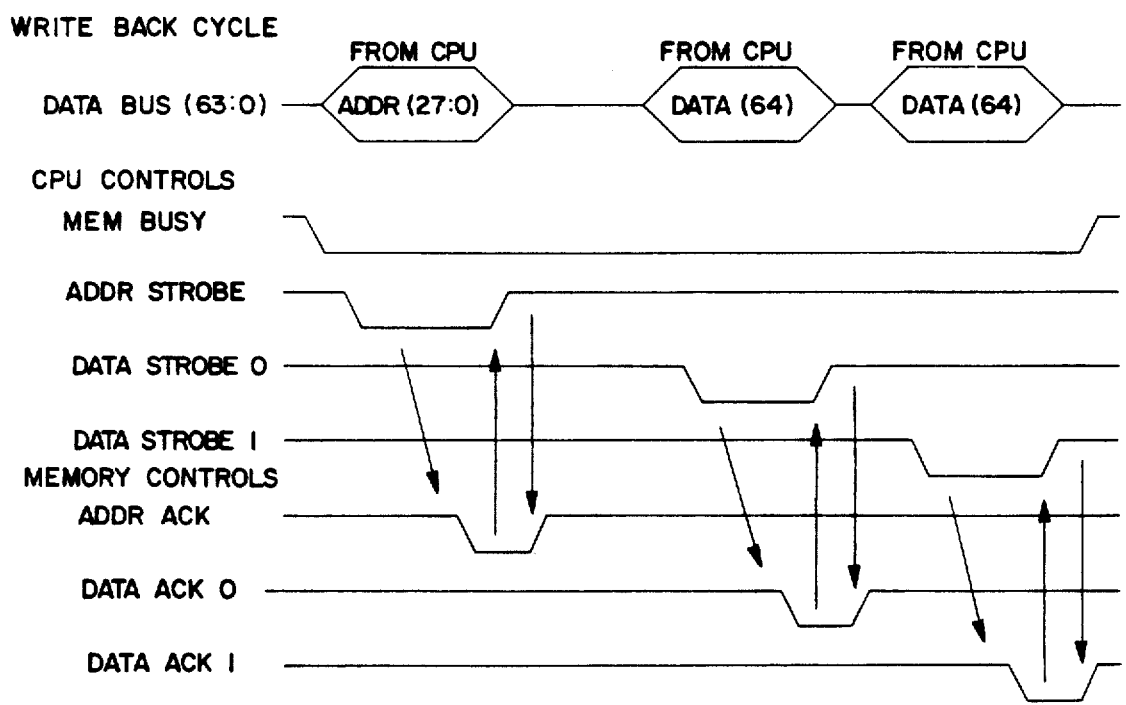
FIG. 11b is a timing diagram of the memory bus cycle for performing a write back cycle.
Figure 11C:
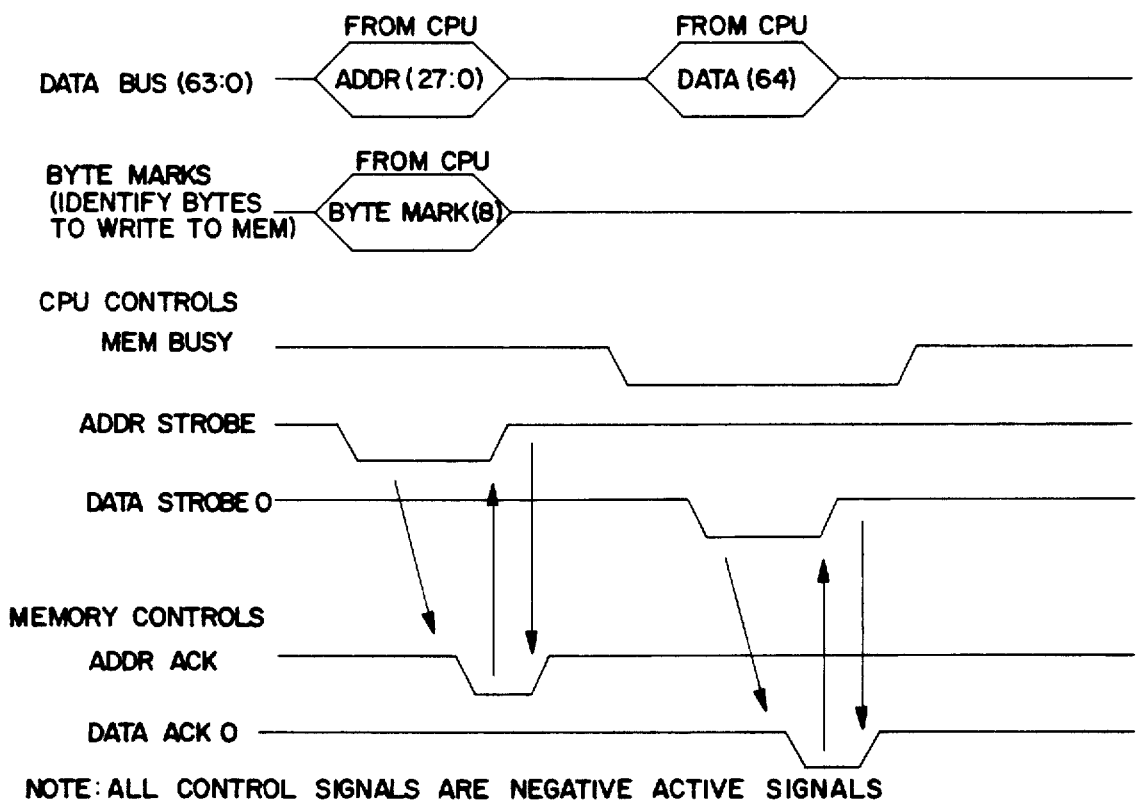
FIG. 11c is a timing diagram of the memory bus cycle for performing a write to a Don't Cache page.

The Memory Data Bus Timing shown in FIG. 11a-11c shows the timing of Block Read, Write Back, and Write to Don't Cache Page bus cycles. Since the cache block size is 128 bits, each cache block update requires two data transfers. As indicated above the 64 bits containing the data addressed by CPU 11 are always returned on the first transfer for Block Read bus cycles. The "Memory Busy" control signal active during the Write Back cycle is used to inhibit the start of the next cache miss cycle until the previous Write Back cycle can complete.

On Write to Don't Cache Page bus cycles, the 8 bit Byte Mark field, sent during the address transfer phase of the cycle, defines which of the 8 bytes of data, sent during the data phase, are to be updated in memory 31.

In addition to the foregoing hardware, the operating system kernel must be modified in two fundamental ways to support alias addressing:

1) The operating system utilities which generate user alias addresses must be modified to guarantee that alias addresses conform to the rule requiring that their low order (N+M) address bits, as a minimum, must match.

2) Instances of alias addresses inside the operating system, which cannot be made to conform to the rule requiring the match of the low order (N+M) bits, must be assigned to "Don't Cache" pages.

The kernel changes needed to support alias addressing for the Unix operating system are shown in Appendix A.

APPENDIX A

```
------------------------------/usr/include/sun3/param.h-------------
/*
 * The Virtual Address Cache in Sun-3 requires aliasing addresses be
 * matched in modulo 128K (0x20000) to guarantee data consistency.
 */
#define shm_alignment \
    ((cpu == CPU_SUN3_260) ? 0x20000 : CLBYTES)  /* shared memory alignment */
#define SHMALIGNMENT 4

-----------------------------library shmat call--------------------------
static unsigned _shm_pgsz = 0;
static int _shm_malloc = 1;             /* true if pre-vm-rewrite */
char *_malloc_at_addr();
{
        register struct a {
```

```
                int     shmid;
                uint    addr;
                int     flag;
        }       *uap = (struct a *)u.u_ap;
        register struct shmid_ds        *sp;    /* shared memory header ptr */
        register struct shmid_ds        **spp;
        register int    shmn;
        int     off;
        uint    size;
        uint    fv, lv, pm;
        struct pte      *pte;

#ifdef notdef
        sysinfo.shm++;                          /* bump shared memory count */
endif notdef if ((sp = shmconv(uap->shmid)) == NULL)
                return;
        if (sp->shm_perm.mode & SHM_DEST) {
                u.u_error = EINVAL;
                return;
        }
        if (ipcaccess(&sp->shm_perm, SHM_R))
                return;
        if ((uap->flag & SHM_RDONLY) == 0)
                if (ipcaccess(&sp->shm_perm, SHM_W))
                        return;

/* PRE-VM-REWRITE */
        /* address 0 should be filtered at the syscall library */
        if (uap->addr == 0) {
                printf("shmat called with 0 address?\n");
                u.u_error = EINVAL;
                return;
        }
        /* END ... PRE-VM-REWRITE */ if (uap->flag & SHM_RND)
                uap->addr &= ~(SHMLBA - 1);
        if (uap->addr & SHM_CLOFSET) {
                u.u_error = EINVAL;
                return;
        }

/* PRE-VM-REWRITE */
        /* look for a slot in the per-process shm list */
        spp = &shm_shmem[(u.u_procp - proc) * shminfo.shmseg];
        for (shmn = 0; shmn < shminfo.shmseg; shmn++, spp++)
                if (*spp == NULL)
        }
        tmperr = errno;
        if (free(shmaddr) == -1)
                perror("shmat: free(3) error");
        errno = tmperr;
        return ((char *) ret);

/* END ... PRE-VM-REWRITE */
}
------------------------kernel shmat syscall------------------
/*
 *      shmat - attach a shared memory segment
 */
shmat()
char *
shmat(shmid, shmaddr, shmflg)
int shmid;
char *shmaddr;
int shmflg;
{
```

```
/* PRE-VM-REWRITE */
struct shmid_ds tmp_shmid;
register unsigned size;
register int tmperr, ret;

/*
 * First, get the required address alignment.
 * If this fails, then this is probably a 3.2 binary running
 * on a post-vm-rewrite kernel, in which case the shmat() is
 * implemented in the kernel.
 */
if (_shm_pgsz == 0) {
        tmperr = errno;
        errno = 0;
        _shm_pgsz = syscall(SYS_shmsys, SHMALIGNMENT);
        if (errno != 0)
                _shm_malloc = 0;        /* must be post-vm-rewrite */
        errno = tmperr;
}

/* If post-vm-rewrite, just issue the system call */
if (!_shm_malloc)
        return ((char *)
            syscall(SYS_shmsys, SHMAT, shmid, shmaddr, shmflg));

if (shmctl(shmid, IPC_STAT, &tmp_shmid) == -1) {
        return ((char *) -1);
} size = ((tmp_shmid.shm_segsz + _shm_pgsz - 1) / _shm_pgsz) * _shm_pgsz;

if (shmaddr != 0) {
        if (shmflg & SHM_RND)
                (unsigned)shmaddr &= ~(_shm_pgsz - 1);
        if (((unsigned)shmaddr & (_shm_pgsz - 1)) ||
            (shmaddr == (char *)0) ||
            (_malloc_at_addr(shmaddr, size) != shmaddr)) {
                errno = EINVAL;
                return ((char *) -1);
        }
} else if ((shmaddr = (char *) memalign(_shm_pgsz, size)) == 0) {
        return ((char *) -1);
} if ((ret = syscall(SYS_shmsys, SHMAT, shmid, shmaddr, shmflg)) != -1) {
        return ((char *) ret);
                break;
if (shmn >= shminfo.shmseg) {
        u.u_error = EMFILE;
        return;
}

/* NOTE: much of the following is ripped-off from kern_mman.c */
/* NOTE: the rest is ripped-off from Sun consulting shm driver */

/* make sure that the target address range is already mapped */
size = btoc(sp->shm_segsz);
fv = btop(uap->addr);
lv = fv + size - 1;
if ( (lv < fv) || !isadsv(u.u_procp, fv) || !isadsv(u.u_procp, lv) ) {
        printf("shmat called with unmapped address range %x - %x\n",
                                ctob(fv), (ctob(lv+1) - 1));
        u.u_error = EINVAL;
        return;
}

/* If first attach, create the shared memory region */
SHMLOCK(sp);
if (sp->shm_perm.mode & SHM_INIT) {
        if ((sp->shm_kaddr =
```

```
                        (uint)zmemall(vmemall, (int)ctob(size))) == 0) {
                SHMUNLOCK(sp);
                u.u_error = ENOMEM;
                return;
            }
            sp->shm_perm.mode &= -SHM_INIT;
        }
        SHMUNLOCK(sp);

pm = SHM_PGFLAG | ((uap->flag & SHM_RDONLY) ? PG_URKR : PG_UW);

/* flush the cache before changing the mapping */
        vac_flush((caddr_t)uap->addr, sp->shm_segsz);
        for (off = 0; off < size; off++) {
                pte = vtopte(u.u_procp, (fv + off));
                u.u_procp->p_rssize -= vmemfree(pte, 1);
                *(int *)pte = pm | (getkpgmap((caddr_t)
                                    (sp->shm_kaddr + ctob(off))) & PG_PFNUM);
                ((struct fpte *)pte)->pg_fileno = SHM_FILENO;
        }
        newptes(vtopte(u.u_procp, fv), fv, (int)size);
        *spp = sp;

/* END ... PRE-VM-REWRITE */ sp->shm_nattch++;
        sp->shm_atime = (time_t) time.tv_sec;
        sp->shm_lpid = u.u_procp->p_pid;

u.u_rval1 = uap->addr;
}

/*
 *      shmsys - System entry point for shmat, shmctl, shmdt, and shmget
 *              system calls
 */
shmsys()
{
        register struct a {
                uint    id;
        } *uap = (struct a *)u.u_ap;
        int             shmat(),
                        shmctl(),
                        shmdt(),
                        shmget();
        /* PRE-VM-REWRITE */
        int             shmalignment();
        static int      (*calls[])() = {shmat, shmctl, shmdt, shmget
                                        , shmalignment };
        /* END ... PRE-VM-REWRITE */ if(uap->id > 4) {
                u.u_error = EINVAL;
                return;
        }
        u.u_ap = &u.u_arg[1];
        (*calls[uap->id])();
}

/* PRE-VM-REWRITE */
/*
 *      shmalignment - return the current system's shared memory alignment
 *      restrictions.
 */
int
shmalignment()
{
        u.u_rval1 = shm_alignment;      /* macro defined in <machine/param.h> */
}
```

We claim:

1. In a computer system comprising at least one process being executed, an operating system allocating resources for said processes and utilizing alias addressing, a central processor (CPU) executing said processes and said operating system, a virtually addressed cache tag array (CTA) coupled to said CPU identifying virtual memory blocks being cached, a virtually addressed write back cache data array (CDA) coupled to said CPU caching said identified virtual memory blocks, a memory management unit (MMU) coupled to said CPU translating virtual addresses to physical addresses, a main memory (MM) coupled to said CPU storing virtual memory pages that are currently resident, a cache hit detector (CHD) coupled to said CPU and said CTA detecting cache hits, and processor control logic (PCL) coupled to said CPU, CTA, CDA, MMU, MM, and CHD controlling their operations, the improvement comprising:

a) when a first and second virtual addresses are alias to each other, but not members of a predetermined set of alias addresses, said operating system altering said first and second virtual addresses to equal each other in their n+m low order virtual address bits, thereby causing one cache location to be used for caching a first and second virtual memory locations, said first and second virtual addresses comprising a first and second plurality ordered virtual address bits identifying a first and second virtual memory pages and said first and second virtual memory locations respectively, said first and second virtual memory locations being located within said first and second virtual memory pages, said first and second virtual addresses being translated into the same physical address, said same physical address comprising a plurality of ordered physical address bits identifying a memory page and a memory location of said MM, said memory location being located within said memory page, said predetermined set of alias addresses comprising a predetermined subset of virtual addresses of said operating system's address space, each of said predetermined subset of virtual addresses being alias to at least one other virtual address of said predetermined subset, said CTA having n cache tag entries identifying n virtual memory blocks being cached, said CDA having n cache blocks of m cache locations caching said n identified virtual memory blocks, each of said n virtual memory blocks having m virtual memory locations;

b) when a virtual memory page comprising at least one virtual memory location identified by one of said predetermined set of virtual addresses, said MMU marking said virtual memory page as a Don't Cache Page, thereby, inhibiting virtual memory blocks of said marked virtual memory page from being cached, resulting in all data accesses to said marked virtual memory page being made directly to and from said MM by passing said CDA.

2. The improvement defined by claim 1 wherein said improvement further comprises:

a) alias detect logic means coupled to said memory management unit and said cache tag array for detecting a virtual address as being an alias addressee;

b) alias detect control logic means coupled to said processor control logic and said alias detect logic means for obtaining data used on read cycle and write cycle cache misses from a selected one of said cache data array and said main memory, and for controlling update to the cache data array on write cycle cache misses.

3. The improvement defined by claim 2, wherein said alias detect logic means comprises:

a) a real address register coupled to said memory management unit for storing a translated physical address;

b) a comparator coupled to said memory management unit and said real address register, said comparator generating a logic one when the translated physical address stored in said real address matches a predetermined cache address in said memory management unit;

c) a virtual address register coupled to said cache tag array for storing a plurality of virtual address bits and a cache valid bit, said virtual address bits being extracted from a predetermined cache tag entry;

d) an AND gate having one input coupled to the output of said comparator and a second input coupled to said cache valid bit within said virtual address register;

e) a flop-flop coupled to the output of said AND gate, said flip-flop being set when a real physical address match is detected as determined by the output of said AND gate.

4. The improvement defined by claim 3 wherein said alias detect control logic means comprises a state machine said state machine comprising:

an address state where said flip-flop is clocked;

a first plurality of data states where data are obtained from a cacheable virtual memory page during read cycle cache misses with physical address match detected;

a second plurality of data states where data are written to a cacheable virtual memory page during write cycle cache misses with physical address match detected;

a third plurality of data states where data are obtained from a Don't Cache virtual memory page during read cycle cache misses; and a fourth plurality of data states where data are written to a Don't Cache virtual memory page during write cycle cache misses.

5. The improvement defined by claim 1, wherein said memory management unit marks said virtual memory page comprising at least one virtual memory location identified by one of said predetermined set of virtual addresses by setting a bit within a page descripter for said virtual memory page in said memory management unit, said memory management unit comprising a plurality of virtual memory page descriptors describing a plurality of corresponding virtual memory pages.

6. In a computer system comprising at least one process being executed, an operating system allocating resources for said processes and utilizing alias addressing, a central processor (CPU) executing said processes and said operating system, a virtually addressed cache tag array (CTA) coupled to said CPU identifying virtual memory blocks being cached, a virtually addressed write back cache data array (CDA) coupled to said CPU caching said identified virtual memory blocks, a memory management unit (MMU) coupled to said CPU translating virtual addresses to physical addresses, a main memory (MM) coupled to said CPU storing virtual memory pages that are currently resident, a cache hit detector (CHD) coupled to said CPU and said CTA detecting cache hits, and processor control logic (PCL) coupled to said CPU, CTA, CDA, MMU, MM, and CHD controlling their operations, a method for detecting data inconsistencies in said CDA and correcting detected data inconsistencies, said method comprising the steps of:

a) altering a first and second virtual addresses to equal each other in their n+m low order virtual address bits, when said first and second addresses are alias to each other, but not members of a predetermined set of alias addresses, thereby causing one cache location to be used for caching a first and second virtual memory locations, said first and second virtual addresses comprising a first and second plurality ordered virtual address bits identifying a first and second virtual memory pages and said first and second virtual memory locations respectively, said first and second virtual memory locations being located within said first and second virtual memory pages, said first and second virtual addresses being translated into the same physical address, said same physical address comprising a plurality of ordered physical address bits identifying a memory page and a memory location of said MM, said memory location being located within said memory page, said predetermined set of alias addresses comprising a predetermined subset of virtual addresses of said operating system's address space, each of said predetermined subset of virtual addresses being alias to at least one other virtual address of said predetermined subset, said CTA having n cache tag entries identifying n virtual memory blocks being cached, said CDA having n cache blocks of m cache locations caching said n identified virtual memory blocks, each of said n virtual memory blocks having m virtual memory locations;

b) marking a virtual memory page as a Don't Cache page, when said virtual memory pate comprising at least one virtual memory location identified by one of said predetermined set of virtual addresses, thereby, inhibiting virtual memory blocks of said marked virtual memory page from being cached, resulting in all data accesses to said marked virtual memory page being made directly to and from said MM by passing said CDA.

7. The improvement defined as claim 6 wherein said method further comprises the steps of:

a) detecting a virtual address as being an alias addressee;

b) obtaining data used on read cycle and write cycle cache misses from a selected one of said cache data array and said main memory;

c) selectively updating the cache data array on write cycle cache misses.

8. The improvement defined by claim 7 wherein said detecting step comprises the steps of:

a) storing a translated physical address in a real address register;

b) generating a comparator output which is a logic one when the translated physical address stored in said real address register matches a predetermined cache address in said memory management unit;

c) storing a plurality of virtual address bits and a cache bit in a virtual address register, said plurality of virtual address bit being extracted from a predetermined cache tag entry;

d) inputting to an AND gate one input coupled to the output of said comparator and a second input coupled to said cache valid bit within said virtual address register;

d) setting a flip-flop coupled to the output of said AND gate when a physical address match is detected as determined by the output of said AND gate.

9. The improvement defined by claim 6, wherein said marking step comprises setting a bit within a page descripter for said virtual memory page in said memory management unit, said memory management unit comprising a plurality of virtual memory page descriptors describing a plurality of corresponding virtual memory pages.

* * * * *

UNITED STATES PATENT AND TRADEMARK OFFICE
CERTIFICATE OF CORRECTION

PATENT NO.  : 5,119,290
DATED       : 6/2/92
INVENTOR(S) : Van Loo et al

It is certified that error appears in the above-identified patent and that said Letters Patent is hereby corrected as shown below:

Title Page:

[75] Inventors: delete "William V. Loo, Palo Alto; John Watkins, Sunnyvale; Joseph Moran, Santa Clara; William Shannon, Los Altos; Ray Cheng, Cupertino, all of Calif." and insert --William Van Loo, Palo Alto; John Watkins, Sunnyvale; Joseph Moran, Santa Clara; William Shannon, Los Altos; Ray Cheng, Cupertino, all of Calif.--

[19] "Loo et al" should read --Van Loo et al--.

Signed and Sealed this

Third Day of November, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,119,290
DATED : June 2, 1992
INVENTOR(S) : Loo et al.

It is certified that error appears in the above-indentified patent and that said Letters Patent is hereby corrected as shown below:

In column 19, claim 6 at line 15, please delete " second " and insert -- second virtual --.

In column 20, claim 6 at line 2, please delete " pate " and insert -- page --.

In column 20, claim 8 at line 29, please delete " bit " and insert -- bits --.

Signed and Sealed this

Second Day of September, 1997

*Attest:*

BRUCE LEHMAN

*Attesting Officer*  *Commissioner of Patents and Trademarks*